(12) United States Patent
Saito et al.

(10) Patent No.: US 8,409,687 B2
(45) Date of Patent: Apr. 2, 2013

(54) UV-CURABLE COMPOSITION FOR OPTICAL DISCS AND OPTICAL DISC

(75) Inventors: Hirokazu Saito, Saitama (JP); Takeshi Isonaka, Saitama (JP); Hideya Suzuki, Ichihara (JP); Youzou Yamashina, Ichihara (JP); Shin Sasamoto, Ichihara (JP); Jun Noguchi, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/394,277

(22) PCT Filed: Oct. 12, 2010

(86) PCT No.: PCT/JP2010/067825
§ 371 (c)(1), (2), (4) Date: Mar. 5, 2012

(87) PCT Pub. No.: WO2011/052369
PCT Pub. Date: May 5, 2011

(65) Prior Publication Data
US 2012/0163158 A1    Jun. 28, 2012

(30) Foreign Application Priority Data

Oct. 29, 2009 (JP) ................ 2009-248816
Nov. 25, 2009 (JP) ................ 2009-267370

(51) Int. Cl.
*B32B 3/02*     (2006.01)
*G11B 7/24*    (2006.01)

(52) U.S. Cl. ...... 428/65.1; 428/64.4; 428/421; 428/522; G9B/7.175

(58) Field of Classification Search ............ 428/64.4, 428/65.1, 421, 522; 525/276, 326.2, 374, 525/384, 385, 386; 526/242, 247; G9B/7.175
See application file for complete search history.

(56) References Cited

U.S. PATENT DOCUMENTS

| | | | | |
|---|---|---|---|---|
| 3,847,978 A | * | 11/1974 | Sianesi et al. | 562/577 |
| 6,391,459 B1 | * | 5/2002 | Szum et al. | 428/421 |
| 6,680,118 B2 | * | 1/2004 | Szum et al. | 428/375 |
| 8,030,412 B2 | * | 10/2011 | Suzuki et al. | 525/326.2 |
| 2010/0214901 A1 | | 8/2010 | Esaki et al. | |

FOREIGN PATENT DOCUMENTS

| JP | 2005-216352 A | 8/2005 |
|---|---|---|
| JP | 2006-2132 A | 1/2006 |
| JP | 2006-219657 A | 8/2006 |

(Continued)

OTHER PUBLICATIONS

International Search Report of PCT/JP2010/067825, mailing date of Nov. 16, 2010.

*Primary Examiner* — Gerard Higgins
(74) *Attorney, Agent, or Firm* — Westerman, Hattori, Daniels & Adrian, LLP

(57) ABSTRACT

A UV-curable composition for optical discs contains a fluorine-containing UV-curable resin having a poly(perfluoroalkylene ether) chain and a UV-curable group. The fluorine-containing UV-curable resin exhibits good compatibility with the composition and satisfactorily localizes in and near a surface of a coating film. Thus, the composition can be used to form an outermost layer of an optical disc such that the droplet size of grease such as that constituting fingerprints adhering to the outermost layer is reduced and scattering of light having a short oscillation wavelength passing through the outermost layer is suppressed. Accordingly, an optical disc on and from which signals can be satisfactorily recorded and read is formed.

6 Claims, 1 Drawing Sheet

FOREIGN PATENT DOCUMENTS

| | | |
|---|---|---|
| JP | 2007-46049 A | 2/2007 |
| JP | 2009-70515 A | 4/2009 |
| WO | 2007/010712 A1 | 1/2007 |
| WO | 2009/125697 A1 | 10/2009 |
| WO | WO 2009133770 A1 * | 11/2009 |

* cited by examiner

UV-CURABLE COMPOSITION FOR OPTICAL DISCS AND OPTICAL DISC

TECHNICAL FIELD

The present invention relates to optical discs and in particular to a UV-curable composition for optical discs to be used in outermost layers of optical discs on and from which information is recorded and read with a blue laser beam having an oscillation wavelength in a range of 370 nm to 430 nm.

BACKGROUND ART

A digital versatile disc (DVD) which is the mainstream standard of optical discs and enables high-density recording has a structure constituted by two 0.6-mm-thick substrates bonded to each other with an adhesive. In order to achieve higher densities in DVDs, a 650 nm laser beam having a wavelength shorter than that used for compact discs (CDs) has been used and the numerical aperture of the optical system has been increased.

However, higher densities are needed to read and record high-quality images suitable for high-definition televisions (HDTV). Studies are being made on methods for achieving even higher recording densities, which will mark the next generation of DVDs, and optical discs for such use. There has been proposed a high-density recording method in which a novel optical disc structure is employed that uses a blue laser beam having a wavelength shorter than that used for DVDs and an optical system having a high numerical aperture.

This optical disc is obtained by forming a recording layer on a transparent or opaque substrate composed of a plastic such as polycarbonate and stacking a light-transmitting layer about that is 100 μm in thickness on the recording layer and is configured to allow entry thereinto of recording light and/or reading light through the light-transmitting layer. From the viewpoint of productivity, most studies have focused on the use of UV-curable compositions in the light-transmitting layer of an optical disc.

Optical discs are required to retain stable read-write characteristics on a long-term basis. Thus, the light-transmitting layer preferably has high shape stability. When the light-transmitting layer constitutes the outermost layer, surface properties of being resistant to scratching and adherence of fingerprints and the like and allowing fingerprints to be easily wiped off are desirable. A composition that contains inorganic particles such as silica, a silane compound, etc., and that improves the slidability of the surface has been disclosed as a composition to be used in the outermost layer of an optical disc (e.g., refer to PTL 1 and PTL 2). However, when a composition containing fine inorganic particles or a silane compound is used in a thick light-transmitting layer that serves as the outermost layer of an optical disc, the compatibility is poor and cloudiness may occur.

A UV-curable composition containing a silane compound has been disclosed as a UV-curable resin composition that resists adherence of contaminants such as fingerprints (e.g., refer to PTL 3). Although this UV-curable composition can properly prevent adherence of fingerprints, when the composition is used at a surface of a light-transmitting layer of recordable blu-ray discs such as BD-R and BD-RE discs and read/write operation is conducted after adherence of fingerprints, sufficient and satisfactory signal characteristics are not always achieved due to the large droplet size of the fingerprints.

CITATION LIST

Patent Literature

PTL 1: Japanese Unexamined Patent Application Publication No. 2005-216352
PTL 2: Japanese Unexamined Patent Application Publication No. 2006-219657
PTL 3: Japanese Unexamined Patent Application Publication No. 2007-046049

SUMMARY OF INVENTION

Technical Problem

An object of the present invention is to provide a UV-curable composition which can form the outermost layer of an optical disc with which signals are satisfactorily read and recorded despite adherence of fingerprints, scratching rarely occurs due to wiping-off of adhered fingerprints, and the fingerprint wipe-off property does not deteriorate much even when wiping was repeatedly performed, and an optical disc.

Solution to Problem

A UV-curable composition according to the present invention contains trace amounts of a particular fluorinated acrylic copolymer and thus has good compatibility, satisfactorily localizes in or near a surface of a coating film, and offers a high anti-fingerprint property.

In other words, the present invention provides a UV-curable composition for optical discs and for use in the outermost layer of an optical disc, the UV-curable composition containing a fluorine-containing UV-curable resin having a poly(perfluoroalkylene ether) chain and a UV-curable group.

Advantageous Effects of Invention

A UV-curable composition for optical discs according to the present invention rarely causes scattering of a short-oscillation-wavelength laser beam passing therethrough since the droplet size of grease such as that constituting fingerprints adhering thereto is small. Moreover, a good wipe-off property is exhibited even when grease such as that constituting adhered fingerprints is repeatedly wiped off, and deterioration of the wipe-off property is suppressed despite repeated wiping. Clouding and the like do not occur and high transparency is achieved. Accordingly, the composition is useful for use in the outermost layer of an optical disc on and from which information is recorded and read with a blue laser beam having a short oscillation wavelength.

DESCRIPTION OF EMBODIMENTS

[UV-Curable Composition for Optical Discs]

Figure 1:
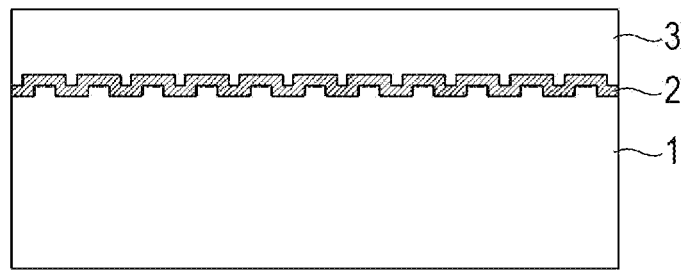
FIG. 1 is a diagram illustrating an example of a single-layer optical disc according to the present invention.

A UV-curable composition for optical discs according to the present invention is a UV-curable composition for use in the outermost layer of an optical disc, the UV-curable composition containing a fluorine-containing UV-curable resin having a poly(perfluoroalkylene ether) chain and a UV-curable group.

(Fluorine-Containing UV-Curable Resin)

The fluorine-containing UV-curable resin used in the present invention has a poly(perfluoroalkylene ether) chain and a UV-curable group. The fluorine-containing UV-curable resin can be obtained by the following process.

An example of the fluorine-containing UV-curable resin having a poly(perfluoroalkylene ether) chain is a fluorine-containing UV-curable resin (1) obtained by allowing a polymer (P1), which is obtained by copolymerizing a compound (d1) having a structural site having a poly(perfluoroalkylene ether) chain and radical polymerizable unsaturated groups at both ends and a radically polymerizable unsaturated monomer (d2) having a reactive functional group (R1) as essential monomer components, to react with a compound (d3) having a functional group (R2) having reactivity with the functional group (R1) and a UV-curable group.

Another example is a fluorine-containing UV-curable resin (2) obtained by allowing a polymer (P2) of radical polymerizable unsaturated monomer (d2) having a reactive functional group (R1) to react with a compound (d1') having a poly(perfluoroalkylene ether) chain having, at both ends, functional groups (R2) reactive to the reactive functional group (R1) and with a compound (d3) having a functional group (R2) reactive to the functional group (R1) and a UV-curable group.

Examples of the radical-polymerizable unsaturated monomer (d2) include acrylic monomers, aromatic vinyl monomers, vinyl ester monomers, and maleimide monomers. Examples of the reactive functional group (R1) of the radically polymerizable unsaturated monomer (d2) include a hydroxyl group, an isocyanate group, an epoxy group, and a carboxyl group.

Specific examples of the radical-polymerizable unsaturated monomer (d2) include hydroxyl-containing unsaturated monomers such as 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, 1,4-cyclohexanedimethanol mono(meth)acrylate, N-(2-hydroxyethyl)(meth)acrylamide, glycerin mono(meth)acrylate, polyethylene glycol mono(meth)acrylate, polypropylene glycol mono(meth)acrylate, 2-hydroxy-3-phenoxypropyl(meth)acrylate, 2-(meth)acryloyloxyethyl-2-hydroxyethyl phthalate, and hydroxyl-terminated lactone-modified (meth)acrylate; isocyanate-containing unsaturated monomers such as 2-(meth)acryloyloxy ethyl isocyanate, 2-(2-(meth)acryloyloxyethoxy)ethyl isocyanate, and 1,1-bis((meth)acryloyloxymethyl)ethyl isocyanate; epoxy-containing unsaturated monomers such as glycidyl methacrylate and 4-hydroxybutyl acrylate glycidyl ether; and carboxyl-containing unsaturated monomers such as (meth)acrylic acid, 2-(meth)acryloyloxyethyl succinic acid, 2-(meth)acryloyloxyethyl phthalic acid, and itaconic acid.

The radical-polymerizable unsaturated monomer (d2) may be copolymerized with another radical-polymerizable unsaturated monomer. Examples of this another radical-polymerizable unsaturated monomer include acrylic acid esters such as methyl(meth)acrylate, ethyl(meth)acrylate, n-propyl(meth)acrylate, n-butyl(meth)acrylate, isobutyl(meth)acrylate, n-pentyl(meth)acrylate, n-hexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, cyclohexyl(meth)acrylate, and isobornyl(meth)acrylate; aromatic vinyls such as styrene, α-methylstyrene, p-methylstyrene, and p-methoxystyrene; and maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

Examples of the poly(perfluoroalkylene ether) chain of the compound (d1) or the compound (d1') include those having structures formed by alternately bonding divalent fluorinated carbon groups having 1 to 3 carbon atoms, and oxygen atoms are alternately bonded to each other. The divalent fluorinated carbon groups having 1 to 3 carbon atoms may be of one type or a mixture of two or more types. Specific examples thereof include the groups represented by structural formula 1 below.

[Chem. 1]

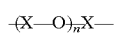     1

(In structural formula 1, X represents one of structural formulae a to d below, all X's in structural formula 1 may have the same structure or a plurality of structures may be present at random or in blocks. n represents the number of repeating units and is 1 or more.)

[Chem. 2]

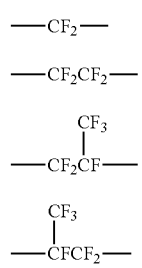

Among these, a chain containing both a perfluoromethylene structure represented by structural formula a and a perfluoroethylene structure represented by structural formula b is particularly preferred from the viewpoint of obtaining a coating film having high stain-proof properties such as fingerprint wipe-off property of the coating film surface. The presence ratio of the perfluoromethylene structure represented by structural formula a to the perfluoroethylene structure represented by structural formula b is preferably 1/4 to 4/1 in terms of molar ratio (structure a/structure b) since a coating film with high stain-proof properties is obtained. The value of n in structural formula 1 is preferably in a range of 3 to 40 and more preferably in a range of 6 to 30.

The total number of fluorine atoms contained in one poly(perfluoroalkylene ether) chain is preferably in a range of 18 to 200 and more preferably in a range of 25 to 80 since the poly(perfluoroalkylene ether) chain offers high stain-proof properties, such as fingerprint wipe-off property, and slidability and improves solubility with a non-fluorine curable resin compositions.

The UV-curable group of the fluorine-containing UV-curable resin used in the present invention is an ethylenic double bond that exhibits curability by irradiation with an active energy rays. Specific examples thereof include those groups represented by structural formulae U-1 to U-3 below.

[Chem. 3]

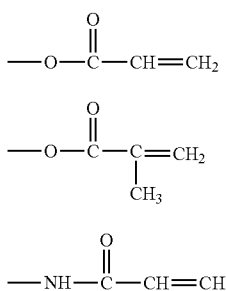

U-1
U-2
U-3

The UV-curable group described above may be introduced into the fluorine-containing UV-curable resin used in the present invention by, for example, obtaining the polymer (P1) or polymer (P2) and then causing the reactive functional group (R1) in a side chain of the polymer to react with a compound (d3) having a functional group (R2) reactive to the reactive functional group (R1) and a UV-curable group.

Accordingly, from the viewpoint of ease of the industrial production, the fluorine-containing UV-curable resin is preferably either a resin (hereinafter this resin is referred to as "fluorine-containing UV-curable resin (1)") obtained by allowing a polymer (P1), which is obtained by copolymerizing a compound (d1) having a structural segment including a poly(perfluoroalkylene ether) chain having radical-polymerizable unsaturated groups at both ends and a radical-polymerizable unsaturated monomer (d2) having a reactive functional group (R1) as essential monomer components, to react with a compound (d3) having a functional group (R2) reactive to the functional group (R1) and a UV-curable group, or a resin (hereinafter this resin is referred to as "fluorine-containing UV-curable resin (2)") obtained by allowing a polymer (P2) of a radical-polymerizable unsaturated monomer (B) having a reactive functional group (R1) to react with a compound (d1') including a poly(perfluoroalkylene ether) chain having functional groups (R2) at both ends, the functional groups (R2) being reactive to the reactive functional group (R1), and with a compound (d3) having a functional group (R2) reactive to the functional group (R1) and a UV-curable group.

Examples of the compound (d1) having a structural site having a poly(perfluoroalkylene ether) chain and radical-polymerizable unsaturated groups at both ends used in producing the fluorine-containing UV-curable resin (1) include compounds having the aforementioned poly(perfluoroalkylene ether) chain having, at both ends, radical-polymerizable unsaturated groups represented by structural formulae U'-1 to U'-4 below.

[Chem. 4]

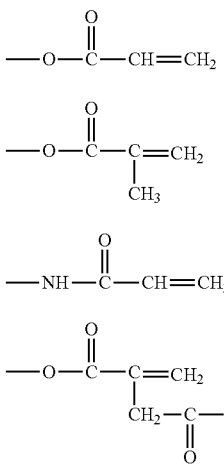

U'-1
U'-2
U'-3
U'-4

Among these radical-polymerizable unsaturated groups, an acryloyloxy group represented by structural formula U'-1 or a methacryloyloxy group represented by structural formula U'-2 are preferred from the viewpoints of availability and ease of production of the compound (d1) and the reactivity to the radical-polymerizable unsaturated monomer described above.

Examples of the compound (d1) having the acryloyloxy group or the methacryloyloxy group include compounds represented by structural formulae d1-1 to d1-10 below. Note that "-PFPE-" in each of the structural formulae below represents a poly(perfluoroalkylene ether) chain.

[Chem. 5]

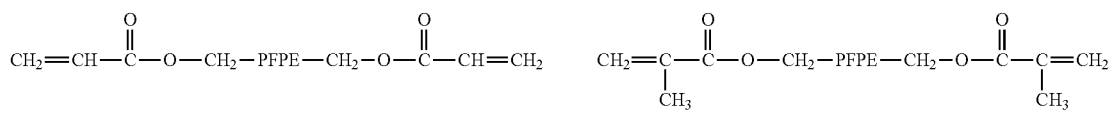

d1-1    d1-2

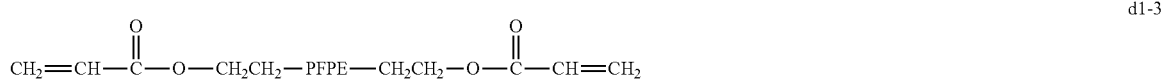

d1-3

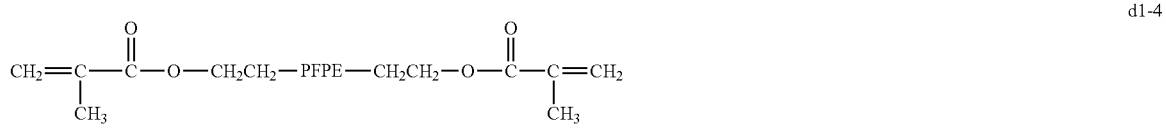

d1-4

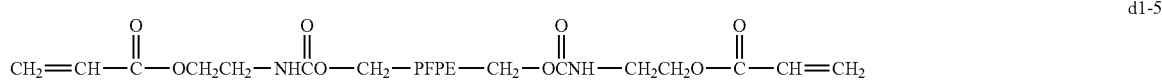

d1-5

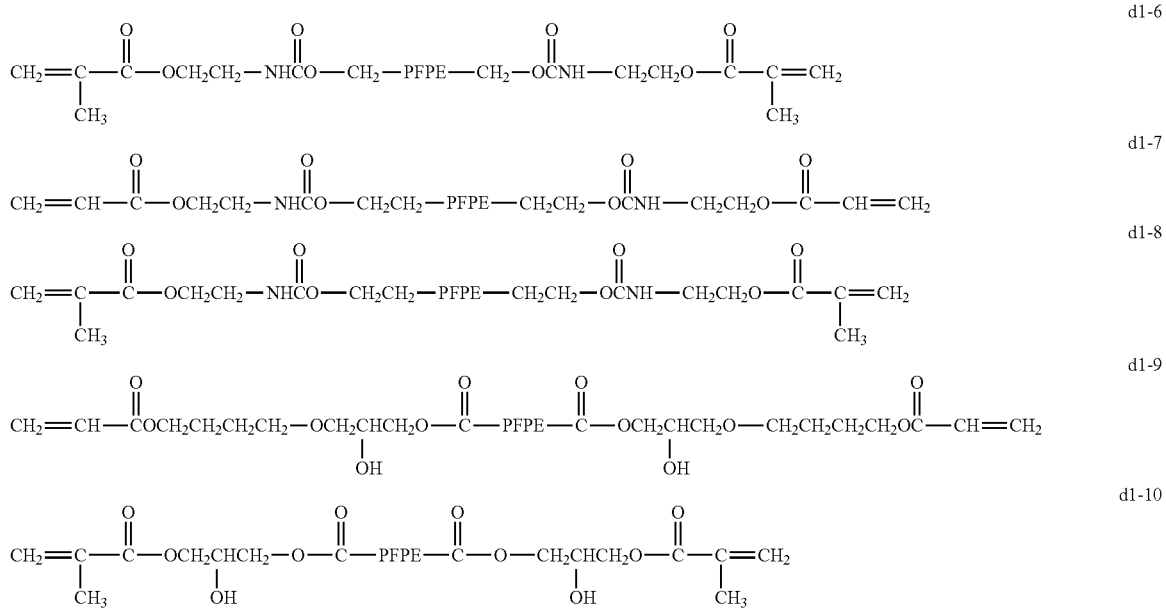

Among these, compounds represented by structural formulae d1-1, d1-2, d1-5, and d1-6 are preferable since industrial production of the compound (d1) itself is easy and the polymerization reaction for producing the polymer (P1) can be easily carried out.

Examples of the method for producing the compound (d1) described above include a method for obtaining the compound (d1) by causing a compound including a poly(perfluoroalkylene ether) chain having one hydroxyl group at each end to react with (meth)acrylic acid chloride through dehydrochlorination, a method for obtaining the compound (d1) by dehydrating (meth)acrylic acid, a method for obtaining the compound (d1) by subjecting 2-(meth)acryloyloxyethyl isocyanate to urethanation, a method for obtaining the compound (d1) by esterifying itaconic anhydride, a method for producing the compound (d1) by causing a compound including a poly(perfluoroalkylene ether) chain having one carboxyl group at each end to react with 4-hydroxybutyl acrylate glycidyl ether by esterification, a method of obtaining the compound (d1) by esterifying glycidyl methacrylate, and a method for obtaining the compound (d1) by causing a compound including a poly(perfluoroalkylene ether) chain having one isocyanate group at each end to react with 2-hydroxyethyl acrylamide. Of these, the method for obtaining the compound (d1) by reacting a compound including a poly(perfluoroalkylene ether) chain having one hydroxyl group at each end to react with (meth)acrylic acid chloride through dehydrochlorination and the method for obtaining the compound (d1) by subjecting 2-(meth)acryloyloxyethyl isocyanate to urethanation are particularly preferable from the synthesis viewpoint.

An example of the method for producing the polymer (P1) is a method by which the compound (d1), a radical-polymerizable unsaturated monomer (d2) having a reactive functional group (R1), and, optionally, another radically polymerizable unsaturated monomer are polymerized in an organic solvent using a radical-polymerization initiator. Examples of the organic solvent used in the method include ketones, esters, amides, sulfoxides, ethers, and hydrocarbons. More specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene, and xylene. Selection may be adequately made from these by considering the boiling point, compatibility, and polymerizability. Examples of the radical polymerization initiator include peroxides such as benzoyl peroxide and azo compounds such as azobisisobutyronitrile. If needed, a chain transfer agent such as lauryl mercaptan, 2-mercaptoethanol, thioglycerol, ethyl thioglycolate, or octyl thioglycolate may be used.

The resulting polymer (P1) preferably has a number-average molecular weight in a range of 800 to 3,000 and more preferably in a range of 1,000 to 2,000. The polymer (P1) preferably has a weight-average molecular weight in a range of 1,500 to 20,000 and more preferably in a range of 2,000 to 8,000. When the average molecular weights of the polymer (P1) are within these ranges, crosslinking and insolubilization during polymerization can be prevented. Moreover, the number of the polymerizable unsaturated groups in one molecule of the final product, i.e., fluorine-containing UV-curable resin (1), can be increased.

A desired fluorine-containing UV-curable resin (1) is obtained by causing the polymer (P1) obtained as such to react with a compound (d3) having a functional group (R2) reactive to the functional group (R1) and a UV-curable group.

Examples of the functional group (R2) of the compound (d3) include a hydroxyl group, an isocyanate group, an epoxy group, and a carboxyl group. For example, when the functional group (R1) is a hydroxyl group, the functional group (R2) may be an isocyanate group. When the functional group (R1) is an isocyanate group, the functional group (R2) may be a hydroxyl group. When the functional group (R1) is an epoxy group, the functional group (R2) may be a carboxyl group. When the functional group (R1) is a carboxyl group, the functional group (R2) may be an epoxy group.

Examples of the compound (d3) are the same as the examples of the radical-polymerizable unsaturated monomer (d2) listed above. In addition, a compound having two or more UV-curable groups, such as 2-hydroxy-3-acryloyloxypropyl methacrylate, pentaerythritol triacrylate, or dipentaerythritol pentaacrylate, may be used.

Of these, 2-hydroxyethyl acrylate, 2-hydroxypropyl acrylate, 3-hydroxypropyl acrylate, 2-hydroxybutyl acrylate, 4-hydroxybutyl acrylate, 1,4-cyclohexanedimethanol monoacrylate, 2-hydroxy-3-acryloyloxypropyl methacrylate, pentaerythritol triacrylate, dipentaerythritol pentaacrylate, N-(2-hydroxyethyl)acrylamide, 2-acryloyloxyethyl isocyanate, 4-hydroxybutyl acrylate glycidyl ether, and acrylic acid are preferred since these have favorable curability by irradiation with an active energy ray such as UV.

The method of causing the polymer (P1) to react with a compound (d3) having a functional group (R2) reactive to the functional group (R1) and a UV-curable group may be conducted under conditions that do not polymerize the UV-curable group in the compound (d3). For example, the reaction is preferably conducted by adjusting the temperature condition in a range of 30 to 120° C. This reaction is preferably conducted in the presence of a catalyst or a polymerization inhibitor and in the presence of an organic solvent, if needed.

For example, when the functional group (R1) is a hydroxyl group and the functional group (R2) is an isocyanate group or when the functional group (R1) is an isocyanate group and the functional group (R2) is a hydroxyl group, a method that uses p-methoxyphenol, hydroquinone, 2,6-di-t-butyl-4-methylphenol, or the like as the polymerization inhibitor and a dibutyl tin dilaurate, dibutyl tin diacetate, tin octylate, zinc octylate, or the like as a urethanation catalyst where the reaction is performed at 40 to 120° C. and particularly 60 to 90° C. is preferred. When the functional group (R1) is an epoxy group and the functional group (R2) is a carboxyl group or when the functional group (R1) is a carboxyl group and the functional group (R2) is an epoxy group, a method that uses p-methoxyphenol, hydroquinone, 2,6-di-t-butyl-4-methylphenol, or the like as the polymerization inhibitor and a tertiary amine such as triethyl amine, a quaternary ammonium such as tetramethyl ammonium chloride, a tertiary phosphine such as triphenyl phosphine, a quaternary phosphonium such as tetrabutyl phosphonium chloride, or the like as an esterification catalyst where the reaction is performed at 80 to 130° C. and particularly 100 to 120° C. is preferred.

Examples of the organic solvent used in the reaction include ketones, esters, amides, sulfoxides, ethers, and hydrocarbons. More specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene, xylene, and the like are used. Selection may be adequately made from these by considering the boiling point and compatibility.

In order to produce a fluorine-containing UV-curable resin (2), first, a radical-polymerizable unsaturated monomer (d2) having a reactive functional group (R1) is polymerized into a polymer (P2). During this process, as mentioned above, another radical-polymerizable unsaturated monomer may be used in combination with the radical-polymerizable unsaturated monomer (d2) to conduct copolymerization. An example of the polymerization method is, as with the method for producing the polymer (P1), a method by which the radically polymerizable unsaturated monomer (d2) having a reactive functional group (R1), and, optionally, another radical-polymerizable unsaturated monomer are polymerized using a radical-polymerization initiator. This reaction is preferably conducted in the presence of an organic solvent and a chain transfer agent may be used if needed. Examples of the organic solvent, radical polymerization initiator, and chain transfer agent that can be used are the same as those used in producing the polymer (P1).

The resulting polymer (P2) preferably has a number-average molecular weight in a range of 800 to 3,000 and more preferably in a range of 1,000 to 2,000 as determined by GPC measurement. The polymer (P2) preferably has a weight-average molecular weight in a range of 1,200 to 6,000 and more preferably in a range of 1,500 to 5,000. When the average molecular weights of the polymer (P2) are within these ranges, crosslinking and insolubilization during polymerization can be prevented.

A desired fluorine-containing UV-curable resin (2) is obtained by causing the polymer (P2) obtained as such to react with a compound (d1') including a poly(perfluoroalkylene ether) chain having, at both ends, functional groups (R2) reactive to the functional group (R1) and a compound (d3) having a functional group (R2) reactive to the functional group (R1) and a UV-curable group.

During this process, the polymer (P2) may be reacted with the compound (d1') first and then with the compound (d3) or vice versa. The compound (d1') and the compound (d3) may be reacted with the polymer (P2) simultaneously.

The amount of the reactive functional group (R1) in the polymer (P2) and the reaction ratio of the compound (d1') and the compound (d3) relative to the reactive group (R1) are preferably adjusted to adequate levels to enhance the effects of the present invention. In particular, the amount of the reactive functional group (R1) in the polymer (P2) is preferably in a range of 100 to 200 g/eq. since the functional group concentration is increased and alkali resistance is enhanced. The reaction is preferably conducted so that the ratio of the functional group (R2) in the compound (d1') is 0.05 to 0.20 mol per mole of the reactive functional group (R1) and that the ratio of the functional group (R2) in the compound (d3) is 0.80 to 0.95 mol per mole of the reactive functional group (R1).

Examples of the functional group (R2) in the compound (d1') including a poly(perfluoroalkylene ether) chain having, at both ends, functional groups (R2) reactive to the reactive functional group (R1) include a hydroxyl group, an isocyanate group, an epoxy group, and a carboxyl group. For example, when the functional group (R1) is a hydroxyl group, the functional group (R2) may be an isocyanate group. When the functional group (R1) is an isocyanate group, the functional group (R2) may be a hydroxyl group. When the functional group (R1) is an epoxy group, the functional group (R2) may be a carboxyl group. When the functional group (R1) is a carboxyl group, the functional group (R2) may be an epoxy group.

Examples of the compound (d1') include compounds represented by structural formulae d1'-1 to d1'-6 below, and the compounds represented by formulae d1'-1 to d1'-6 modified with polyfunctional isocyanate compounds such as hexamethylene diisocyanate and tolylene diisocyanate, and with difunctional epoxy resins such as bisphenol epoxy resin. Note that "-PFPE-" in each of the structural formulae below represents a poly(perfluoroalkylene ether) chain. Among these, unmodified compounds represented by structural formulae d1'-1 to d1'-6 are preferred. In particular, when the functional group (R1) is an isocyanate group, a compound (d1') represented by structural formula d1'-1 is preferred from the viewpoint of high reactivity with the functional group (R1).

[Chem. 6]

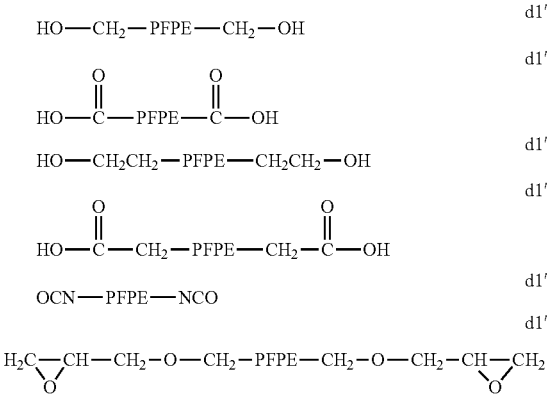

d1'-1
d1'-2
d1'-3
d1'-4
d1'-5
d1'-6

The compound (d3) used in this process may be the same as the compound (d3) used in production of the fluorine-containing UV-curable resin (1) described above.

The reaction of the polymer (P2), the compound (d1'), and the compound (d3) may be conducted by reacting the (P2) with the compound (d1') first and then with the compound (d3), by reacting the polymer (P2) with the compound (d3) first and then with the compound (d1'), or by reacting the polymer (P2) with the compound (d1') and the compound (d3) simultaneously, as mentioned above. The reaction conditions may be adequately selected in any of these methods depending on the type of the functional groups involved in the reaction.

For example, when one of the functional group (R1) in the polymer (P2) and the functional group (R2) in the compound (d1') is a hydroxyl group and the other is an isocyanate group or when one of the functional group (R1) in the polymer (P2) and the functional group (R2) in the compound (d3) is a hydroxyl group and the other is an isocyanate group, a method that uses p-methoxyphenol, hydroquinone, 2,6-di-t-butyl-4-methylphenol, or the like as the polymerization inhibitor and a dibutyl tin dilaurate, dibutyl tin diacetate, tin octylate, zinc octylate, or the like as a urethanation catalyst where the reaction is performed at 40 to 120° C. and particularly 60 to 90° C. is preferred.

When one of the functional group (R1) in the polymer (P2) and the functional group (R2) in the compound (d1') is a carboxyl group and the other is an epoxy group or when one of the functional group (R1) in the polymer (P2) and the functional group (R2) in the compound (d3) is a carboxyl group and the other is an epoxy group, a method that uses p-methoxyphenol, hydroquinone, 2,6-di-t-butyl-4-methylphenol, or the like as the polymerization inhibitor and a tertiary amine such as triethyl amine, a quaternary ammonium such as tetramethyl ammonium chloride, a tertiary phosphine such as triphenyl phosphine, a quaternary phosphonium such as tetrabutyl phosphonium chloride, or the like as an esterification catalyst where the reaction is performed at 80 to 130° C. and particularly 100 to 120° C. is preferred.

In these reactions, an adequate organic solvent may be used. Examples of the organic solvent used in the method include ketones, esters, amides, sulfoxides, ethers, and hydrocarbons. More specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, toluene, xylene, and the like are used. Selection may be adequately made from these by considering the boiling point and compatibility.

The fluorine-containing UV-curable resin such as the fluorine-containing UV-curable resin (1) or the fluorine-containing UV-curable resin (2) preferably has a number-average molecular weight (Mn) in a range of 1,000 to 10,000 and a weight-average molecular weight (Mw) in a range of 2,000 to 100,000 and more preferably has a number-average molecular weight (Mn) in a range of 1,500 to 5,000 and a weight-average molecular weight (Mw) in a range of 4,000 to 50,000. The resins having average molecular weights in these ranges are preferred since they do not undergo gelation during production of the fluorine-containing UV-curable resin and a highly crosslinked coating film having a high developing property can be obtained.

The number-average molecular weight (Mn) and the weight-average molecular weight (Mw) are polystyrene equivalent values based on GPC measurement. The GPC measurement conditions are as follows.

[GPC Measurement Conditions]

Measurement instrument: "HLC-8220 GPC" produced by TOSOH Corporation
Column: Guard column "HHR-H" (6.0 mm I.D.×4 cm) produced by TOSOH Corporation
+"TSK-GEL GMHHR" (7.8 mm I.D.×30 cm) produced by TOSOH Corporation
+"TSK-GEL GMHHR" (7.8 mm I.D.×30 cm) produced by TOSOH Corporation
+"TSK-GEL GMHHR" (7.8 mm I.D.×30 cm) produced by TOSOH Corporation
+"TSK-GEL GMHHR" (7.8 mm I.D.×30 cm) produced by TOSOH Corporation
Detector: ELSD ("ELSD2000" produced by Alltech Associates, Inc.)
Data processing: "GPC-8020 model II, version 4.10" produced by TOSOH Corporation
Measurement conditions: column temperature: 40° C., developing
solvent: tetrahydrofuran, flow rate: 1.0 ml/min.
Standard: Monodisperse polystyrenes with known molecular weights were used according to the measurement manual of the "GPC-8020 model II, version 4.10".
(Polystyrenes Used)
"A-500" produced by TOSOH Corporation
"A-1000" produced by TOSOH Corporation
"A-2500" produced by TOSOH Corporation
"A-5000" produced by TOSOH Corporation
"F-1" produced by TOSOH Corporation
"F-2" produced by TOSOH Corporation
"F-4" produced by TOSOH Corporation
"F-10" produced by TOSOH Corporation
"F-20" produced by TOSOH Corporation
"F-40" produced by TOSOH Corporation
"F-80" produced by TOSOH Corporation
"F-128" produced by TOSOH Corporation
Sample: A 1.0 mass % (resin solid basis) tetrahydrofuran solution is filtered through a microfilter (100 µl).

The fluorine atom content in the fluorine-containing UV-curable resin is preferably in a range of 2 to 35% by mass and more preferably in a range of 5 to 25% by mass. High antifouling property can be obtained when the fluorine atom content in the fluorine-containing UV-curable resin is in this range.

The UV-curable group content in the fluorine-containing UV-curable resin is preferably in a range of 200 to 900 g/eq. and more preferably 200 to 600 g/eq. in terms of UV-curable group equivalence. When the UV-curable group content in the fluorine-containing UV-curable resin is in this range, the cured coating film exhibits high antifouling property and fingerprint wipe-off property.

The fluorine-containing UV-curable resin content relative to the total amount of the UV-curable compound for optical discs is preferably in a range of 0.1 to 5% by mass and more preferably in a range of 0.1 to 3% by mass. The fluorine-containing UV-curable resin can exhibit satisfactory antifouling property and fingerprint wipe-off property and favorable compatibility even when contained in such small amounts.

(Photo-Curable Compound)

Examples of a photo-curable compound used in the present invention include various types of photo-curable compounds such as unsaturated polyester-type, acryl-type, thiol-en-type, and epoxy-type compounds. When the photo-curable compound is used in a hard coat layer of an optical information recording medium, adequate selection may be made by considering the hardness, elastic modulus, adhesiveness to the substrate to be bonded, viscosity during application, etc.

In particular, an acryl-type photo-curable compound is preferably used as a UV-curable compound that is transparent and has good weathering resistance for use in an optical information recording medium. Examples of the acryl-type photo-curable compound include (meth)acrylate monomers and (meth)acrylate oligomers described below.

Preferable examples of the (meth)acrylate monomers include a monofunctional (meth)acrylate having one acryloyl group in a molecule, a difunctional (meth)acrylate having two acryloyl groups, and a higher functional (meth)acrylate having three or more acryloyl groups. Examples of the monofunctional (meth)acrylate include aliphatic (meth)acrylates such as ethyl(meth)acrylate, butyl(meth)acrylate, 2-ethylhexyl(meth)acrylate, nonyl(meth)acrylate, tridecyl(meth)acrylate, hexadecyl(meth)acrylate, octadecyl(meth)acrylate, isoamyl(meth)acrylate, isodecyl(meth)acrylate, isostearyl (meth)acrylate, ethoxyethoxyethyl(meth)acrylate, 2-hydroxyethyl(meth)acrylate, 2-hydroxypropyl(meth)acrylate, 3-chloro-2-hydroxypropyl(meth)acrylate, methoxyethyl (meth)acrylate, and butoxyethyl(meth)acrylate; and aromatic (meth)acrylates such as benzyl(meth)acrylate, nonylphenoxyethyl(meth)acrylate, tetrahydrofurfuryl(meth)acrylate, glycidyl(meth)acrylate, 2-hydroxy-3-phenoxypropyl(meth) acrylate, nonylphenoxyethyltetrahydrofurfuryl(meth)acrylate, caprolactone-modified tetrahydrofurfuryl(meth)acrylate, acryloylmorpholine, and phenoxyethyl(meth)acrylate. Examples of an alicyclic monomer that can be used include isobornyl(meth)acrylate, norbornyl(meth)acrylate, 2-(meth) acryloyloxymethyl-2-methylbicycloheptaneadamantyl (meth)acrylate, dicyclopentenyl(meth)acrylate, dicyclopentanyl(meth)acrylate, dicyclopentenyloxyethyl(meth) acrylate, tetracyclododecanyl(meth)acrylate, and cyclohexyl (meth)acrylate. Acryloyl morpholine, ethylene oxide-modified phosphoric acid (meth)acrylate, ethylene oxide-modified alkylated phosphoric acid (meth)acrylate, polyether (meth)acrylate, diethylaminoethyl(meth)acrylate, N-vinylpyrrolidone, N-vinylcaprolactam, vinyl ether monomers, etc., may also be used.

Examples of the difunctional (meth)acrylate include 1,4-butanediol di(meth)acrylate, 3-methyl-1,5-pentanediol di(meth)acrylate, 1,6-hexanediol di(meth)acrylate, neopentyl glycol di(meth)acrylate, 2-methyl-1,8-octanediol di(meth)acrylate, 2-butyl-2-ethyl-1,3-propanediol di(meth) acrylate, ethylene glycol di(meth)acrylate, polypropylene glycol di(meth)acrylate, a di(meth)acrylate of a diol obtained by adding 4 mol or more of ethylene oxide or propylene oxide to 1 mol of neopentyl glycol, diethylene glycol di(meth) acrylate, dipropylene glycol di(meth)acrylate, and tripropylene glycol di(meth)acrylate. Examples of the alicyclic difunctional (meth)acrylate include norbornane dimethanol diacrylate, norbornane diethanol di(meth)acrylate, a di(meth) acrylate of a diol obtained by adding 2 mol of ethylene oxide or propylene oxide to norbornane dimethanol, tricyclodecane dimethanol di(meth)acrylate, tricyclodecane diethanol di(meth)acrylate, a di(meth)acrylate of a diol obtained by adding 2 mol of ethylene oxide or propylene oxide to tricyclodecane dimethanol, pentacyclopentadecane dimethanol di(meth)acrylate, pentacyclopentadecane diethanol di(meth) acrylate, a di(meth)acrylate of a diol obtained by adding 2 mol of ethylene oxide or propylene oxide to pentacyclopentadecane dimethanol, a di(meth)acrylate of a diol obtained by adding 2 mol of ethylene oxide or propylene oxide to pentacyclopentadecane diethanol, dimethylol dicyclopentane di(meth)acrylate, and hydroxy pivalic acid neopentyl glycol di(meth)acrylate.

These monofunctional and difunctional (meth)acrylates can be adequately used to adjust the viscosity during application, crosslink density, etc. Tetrahydrofurfuryl(meth)acrylate, 1,6-hexanediol di(meth)acrylate, neopentyl glycol di(meth)acrylate, caprolactone-modified tetrahydrofurfuryl (meth)acrylate, acryloylmorpholine, isobornyl(meth)acrylate, ethylene glycol di(meth)acrylate, polypropylene glycol di(meth)acrylate, a di(meth)acrylate of a diol obtained by adding 4 mol or more of ethylene oxide or propylene oxide to 1 mol of neopentyl glycol, diethylene glycol di(meth)acrylate, dipropylene glycol di(meth)acrylate, tripropylene glycol di(meth)acrylate, and polyether (meth)acrylate are preferred since good adhesion can be imparted when a polycarbonate is used as a substrate for stacking. In particular, tetrahydrofurfuryl(meth)acrylate, 1,6-hexanediol di(meth)acrylate, and neopentyl glycol di(meth)acrylate are preferred.

An acrylate having an alicyclic structure has a rigid ring structure and thus can impart the resulting cured product a high elastic modulus at high temperatures and a high glass transition temperature.

Examples of the trifunctional or higher functional (meth) acrylate include polyfunctional (meth)acrylates such as bis (2-acryloyloxyethyl)hydroxyethyl isocyanurate, bis(2-acryloyloxypropyl)hydroxypropyl isocyanurate, bis(2-acryloyloxybutyl)hydroxybutyl isocyanurate, bis(2-methacryloyloxyethyl)hydroxyethyl isocyanurate, bis(2-methacryloyloxypropyl)hydroxypropyl isocyanurate, bis(2-methacryloyloxybutyl)hydroxybutyl isocyanurate, tris(2-acryloyloxyethyl) isocyanurate, tris(2-acryloyloxypropyl) isocyanurate, tris(2-acryloyloxybutyl) isocyanurate, tris(2-methacryloyloxyethyl) isocyanurate, tris(2-methacryloyloxypropyl) isocyanurate, tris(2-methacryloyloxybutyl) isocyanurate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, a di- or tri(meth)acrylate of a triol obtained by adding 3 mol or more of ethylene oxide or propylene oxide to 1 mol of trimethylolpropane, a tetra(meth)acrylate of a tetraol obtained by adding 4 mol or more of ethylene oxide or propylene oxide to 1 mol of pentaerythritol, and poly(meth) acrylate of dipentaerythritol.

These trifunctional or higher functional (meth)acrylates are preferred since a high elastic modulus can be imparted to the cured product. Among these, tris(2-acryloyloxyethyl) isocyanurate, tris(2-methacryloyloxyethyl) isocyanurate, trimethylolpropane tri(meth)acrylate, pentaerythritol tri(meth) acrylate, pentaerythritol tetra(meth)acrylate, dipentaerythritol penta(meth)acrylate, dipentaerythritol hexa (meth)acrylate, tri(meth)acrylate of a triol obtained by adding 3 to 6 mol of ethylene oxide to 1 mol of trimethylolpropane, and tetra(meth)acrylate of a tetraol obtained by adding 4 to 8 mol of ethylene oxide to 1 mol of pentaerythritol are particularly preferred since a particularly high elastic modulus can be imparted after curing.

Use of a combination of the (meth)acrylate monomer and a (meth)acrylate oligomer is also preferred. For example, epoxy (meth)acrylate having a rigid structure is suitable for use as such an oligomer. Examples of the epoxy (meth)acrylate include bisphenol A-type epoxy (meth)acrylate synthesized by a reaction between (meth)acrylic acid and a reaction product of bisphenol A and epichlorohydrin, a bisphenol S-type epoxy (meth)acrylate synthesized by a reaction between (meth)acrylic acid and a reaction product of bisphenol S and epichlorohydrin, bisphenol F-type epoxy (meth)acrylate synthesized by a reaction between (meth)acrylic acid and a reaction product of bisphenol F and epichlorohydrin, and phenol novolac-type epoxy (meth)acrylate synthesized by a reaction between (meth)acrylic acid and a reaction product of phenol novolac and epichlorohydrin. These bisphenol-type epoxy (meth)acrylates can impart a high elastic modulus and a high hardness to the resulting cured product. Among these, bisphenol A-type epoxy (meth)acrylate is preferable used.

Urethane (meth)acrylates are also preferred. A urethane (meth)acrylate obtained from a compound having two or more isocyanate groups in a molecule, a compound having a hydroxyl group and a (meth)acryloyl group, and a compound having two or more hydroxyl groups in a molecule is preferably used as the urethane (meth)acrylate. A urethane (meth)acrylate obtained by reacting a compound having a hydroxyl group and a (meth)acryloyl group with a compound having two or more isocyanate groups in a molecule is also preferred.

Other oligomers may also be used. For example, polyester (meth)acrylate, polyether (meth)acrylate, and the like may be used in combination.

(Polymerization Initiator)

If needed, a photopolymerization initiator may be used in the UV-curable resin composition of the present invention. Any of known photopolymerization initiators can be used. A photopolymerization initiator of a molecule cleaving type or a hydrogen abstraction type is preferred as the photopolymerization initiator used in the present invention.

Examples of the photopolymerization initiator include molecule-cleaving-type photopolymerization initiators such as benzoin isobutyl ether, 2,4-diethylthioxanthone, 2-isopropylthioxanthone, benzil, 1-hydroxycyclohexyl phenyl ketone, benzoin ethyl ether, benzyl dimethyl ketal, 2-hydroxy-2-methyl-1-phenylpropan-1-on, 1-(4-isopropylphenyl)-2-hydroxy-2-methylpropan-1-on and 2-methyl-1-(4-methylthiophenyl)-2-morpholinopropan-1-on, 2-hydroxy-1-{4-[4-(2-hydroxy-2-methyl-propionyl)-benzyl]-phenyl}2-methyl-propan-1-on, 1-[4-(2-hydroxyethoxy)-phenyl]2-hydroxy-2-methyl-1-propan-1-on, Irgacure 754 produced by Ciba Japan, and ESACURE KIP 150 produced by Nihon SiberHegner K.K., and hydrogen-abstraction-type photopolymerization initiators such as benzophenone, 4-phenylbenzophenone, isophthalphenone, and 4-benzoyl-4'-methyl-diphenyl sulfide.

The photopolymerization initiator preferably does not absorb the wavelength of the light used in writing and reading information on an optical information recording medium used. For example, a photopolymerization initiator that has low optical absorption at and near 400 nm is preferably used when a blue laser disc is used.

(Additives)

Optional components added to the UV-curable resin composition are as follows. These can be used within ranges that do not impair the effects of the present invention. Examples of a sensitizer for the photopolymerization initiator include trimethylamine, methyl dimethanolamine, triethanolamine, p-dimethylaminoacetophenone, ethyl p-dimethylaminobenzoate, isoamyl p-dimethylaminobenzoate, N,N-dimethylbenzylamine, and 4,4'-bis(diethylamino)benzophenone. An amine that does not cause addition reaction with the photopolymerizable compound can be further used in combination. Preferably, these additives are selected so that the solubility in the UV-curable resin composition is high and the UV permeability is not inhibited.

An inorganic component such as silica particles and the like may be contained in order to increase the hardness of the cured product. A solvent for dispersing the inorganic particles is not necessarily used. Preferably, no inorganic particles are contained to avoid problems such as light scattering at inorganic particles.

The UV-curable composition for optical discs according to the present invention containing the fluorine-containing UV-curable resin described above is suitable for use in the outermost layer of an optical disc and is particularly suitable for use in the outermost layer of 370 to 430 nm blue laser optical discs.

The UV-curable resin composition for optical discs according to the present invention may contain the (meth)acrylate oligomer and/or the (meth)acrylate monomer described above depending on the configuration of the optical discs. For example, when the composition is used in a thin hard coat layer constituting the outermost layer of an optical disc, the B-type viscosity of the UV-curable composition for the optical discs is preferably adjusted in a range of 20 to 150 mPa·s at 25° C. When the viscosity is in this range, a thin hard coat layer having a thickness of about 1 to 10 µm can be formed as the outermost layer by application using a spin coater or the like.

When the composition is used in a hard coat layer, the elastic modulus of the UV-cured film at 25° C. is preferably in a range of 1000 to 4000 MPa and more preferably in a range of 1500 to 3000 MPa. When the elastic modulus of the cured film is in this range, scratching and cracking of the cured film can be satisfactorily suppressed.

The UV-curable composition for optical discs according to the present invention preferably contains a trifunctional or higher functional (meth)acrylate when used in a hard coat layer. Incorporation of bisphenol-type epoxy acrylate and/or urethane acrylate is also preferred and when trifunctional (meth)acrylate and a monofunctional and/or difunctional (meth)acrylate are used in combination, the hardness, elastic modulus, adhesiveness to the substrate to be bonded, the viscosity during application, etc., can be satisfactorily adjusted. The respective contents may be adequately adjusted depending on the characteristics required. Preferably, 30% by mass or less, more preferably 1 to 30% by mass, and most preferably 5 to 15% by mass of epoxy (meth)acrylate and/or urethane acrylate is used in the UV-curable resin composition. When epoxy (meth)acrylate is contained in this range, high hardness can be imparted to the resulting cured product, the viscosity during application can be adequately controlled, and skew can be effectively reduced. When urethane acrylate is contained in this range, flexibility can be imparted to the cured film and skew can be effectively reduced. The trifunctional (meth)acrylate content is preferably 2 to 80% by mass and more preferably 30 to 70% by mass. The monofunctional and/or difunctional (meth)acrylate content is preferably 5 to 50% by mass and more preferably 10 to 40% by mass. The ratio of the mono- to tri-functional (meth)acrylates needs to be adjusted according to the type of the (meth)acrylate used. However, when adjustment is made within the above-described ranges, the viscosity during application and the crosslink density after cure can be adjusted in preferred ranges, high hardness can be imparted to the cured product, and skew of the cured product can be reduced.

The UV-curable resin composition for optical discs according to the present invention is suitable for use in the outermost layer of an optical disc that has a light-transmitting layer about 70 to 110 μm in thickness as the outermost layer and that does not have a hard coat layer. When the composition is used in the optical disc having a light-transmitting layer as the outermost layer, the B-type viscosity of the UV-curable resin composition for optical discs is preferably 500 to 3000 mPa·s and more preferably 800 to 2000 mPa·s at 25° C. When the viscosity is in this range, a thick light-transmitting layer having a thickness of about 70 to 110 μm can be formed as the outermost layer by application using a spin coater or the like.

When the composition is used in a light-transmitting layer, the elastic modulus of the UV-cured film at 25° C. is preferably in a range of 100 to 2000 mPa and more preferably in a range of 200 to 1500 mPa. When the elastic modulus of the cured film is in this range, scratching and skew of the cured film can be satisfactorily suppressed.

[Optical Disc]

An optical disc according to the present invention uses the UV-curable composition in the outermost layer and thus high anti-fingerprint property and fingerprint wipe-off property can be achieved. An example configuration of the optical disc according to the present invention is a structure that has a hard coat layer as the outermost layer or a structure that has no hard coat layer instead of a light-transmitting layer as the outermost layer. In the present invention, an optical disc may have any one of these structures. In any structure, when a cured film formed of the UV-curable composition described above is used as the outermost layer, light can be transmitted satisfactorily, a high antifouling property and contamination wipe-off property are exhibited, and a stable antifouling property can be exhibited even after elapse of a long period of time or when left in a high-temperature high-humidity environment. Thus, scattering of light rarely occurs at a surface of the optical disc of the present invention and information can be satisfactorily read and recorded with light.

An optical disc having a light-transmitting layer as the outermost layer is preferably an optical disc prepared by sequentially stacking at least a light-reflecting layer, an information recording layer, and a light-transmitting layer on a substrate in that order and used to read and write information with a blue laser beam through the light-transmitting layer. An optical disc having a hard coat layer as the outermost layer is preferably an optical disc prepared by sequentially stacking at least a light-reflecting layer, an information recording layer, and a light-transmitting layer on a substrate in that order with a hard coat layer constituting the outermost layer, and used to read and write information with a blue laser beam through the hard coat layer.

The light-transmitting layer of the optical disc of the present invention preferably highly efficiently transmits a blue laser beam having an oscillation wavelength of 370 to 430 nm, and preferably has a transmittance of 85% or higher and more preferably 90% or higher for 405 nm light at a thickness of 100 μm.

The thickness of the light-transmitting layer of the optical disc of the present invention is preferably 70 to 110 μm. The thickness of the light-transmitting layer is typically set at about 100 μm. However, since thickness significantly affects the optical transmittance and read/write operation of signals, the thickness needs to be sufficiently controlled.

The elastic modulus of the light-transmitting layer at 25° C. is preferably in a range of 100 to 2000 MPa and more preferably in a range of 200 to 1500 MPa. When the elastic modulus of the cured film is in this range, prevention of scratching and reduction of skew of the cured film can be more easily realized.

The light-reflecting layer may be any layer that can reflect the laser beam and form an optical disc on which recording and reading can be performed. For example, a metal such as gold, copper, or aluminum, an alloy thereof, and an inorganic compound such as silicon can be used. Among these, silver or an alloy mainly composed of silver is preferred since the reflectance for the light at and near 400 nm is high. The thickness of the light-reflecting layer is preferably about 10 to 60 nm.

A disk-shaped circular resin substrate can be used as the substrate and polycarbonate is preferably used as the resin. When the optical disc is a read-only disc, pits for recording information are formed in a surface of the substrate onto which the light-reflecting layer is stacked.

When a hard coat layer is formed on the optical disc, the thickness of the hard coat layer is preferably 1 to 10 μm and more preferably 2 to 5 μm. When the thickness is 2 to 5 μm, the amount of skew can be reduced.

The hard coat layer preferably has a high hardness to reduce scratching. The hardness is preferably 2H or more and more preferably 4H or more in terms of surface pencil hardness.

The elastic modulus of the hard coat layer at 25° C. is preferably in a range of 1000 to 4000 MPa and more preferably in a range of 1500 to 3000 MPa. When the elastic modulus is low within this range, when the elastic modulus is low, the film becomes soft and when the elastic modulus is high, the film becomes brittle which is not favorable.

In the case of a writable optical disc, an information recording layer is provided between a light-reflecting layer and a light-transmitting layer. The UV-curable composition for optical discs according to the present invention rarely causes recording errors during optical recording due to reduced droplet size even when grease such as that constituting fingerprint has adhered. Thus, the composition is suitable for use in a write-type optical disc. The information recording layer of a write-type optical disc may be any layer that allows reading and writing of information and may be a phase change recording layer, an optical magnetic recording layer, or an organic dye recording layer.

When the information recording layer is a phase change recording layer, the information recording layer is usually constituted by a dielectric layer and a phase change film. The dielectric layer is required to exhibit a function of reducing heat generated in the phase change layer and a function of adjusting the reflectance of the disc, and has a mixed composition containing ZnS and $SiO_2$. The phase change film generates different reflectances in an amorphous state and a crystalline state due to the phase of the film being changed. A Ge—Sb—Te based, Sb—Te based, or Ag—In—Sb—Te based alloy can be used in the phase change film.

The optical disc of the present invention may include two or more information recording regions. For example, in the case of a read-only optical disc, a first light-reflecting layer and a first light-transmitting layer are stacked on a substrate having pits, and a second light-reflecting layer and a second light-transmitting layer may be formed on the first light-transmitting layer or another layer formed on the first light-transmitting layer. In such a case, pits are also formed in the first light-transmitting layer or the layer formed on the first light-transmitting layer. In the case of a read/write optical disc, an information recording layer, a light-reflecting layer, and a light-transmitting layer are stacked on a substrate. A second light-reflecting layer, a second information recording layer, and a second light-transmitting layer may be further formed on the light-transmitting layer to obtain a double information recording layer structure, or layers may be further stacked to obtain a structure having three or more information recording layers. When plural layers are stacked, the total thickness of the respective layers may be adjusted within the range of thickness described above.

The optical disc of the present invention may be a read-only disc or read/write disc. A read-only disc can be produced by forming pits, which form an information recording layer, during injection molding of a circular resin substrate, forming a light-reflecting layer on the information recording layer, applying a UV-curable composition to the light-reflecting layer by spin coating or the like, and curing the composition by UV irradiation to form a light-transmitting layer. A read/write disc can be produced by forming a light-reflecting layer on a circular resin substrate, forming an information recording layer such as a phase change film or an optical magnetic recording film, applying the UV-curable composition to the light-reflecting layer by spin coating or the like, and curing the composition by UV irradiation to form a light-transmitting layer.

When the UV-curable composition applied to the light-reflecting layer is cured by UV irradiation, for example, a continuous irradiation method that uses a metal halide lamp, a high-pressure mercury lamp or the like may be performed or a flash exposure method described in U.S. Pat. No. 5,904,795 may be performed. The flash exposure method is more preferred since curing can be conducted highly efficiently.

UV irradiation is preferably controlled so that the irradiation dose is 0.05 to 1 $J/cm^2$. The irradiation dose is more preferably 0.05 to 0.8 $J/cm^2$ and most preferably 0.05 to 0.6 $J/cm^2$. The UV-curable resin composition used in the optical disc of the present invention is sufficiently cured even when the irradiation dose is low, does not cause tucking in surfaces and edge surfaces of the optical disc, and does not cause skew and deformation of the optical disc.

[Embodiments]

Described below are examples of specific structures of a single-layer optical disc and a double-layer optical disc which exemplify the optical disc of the present invention.

Figure 2:
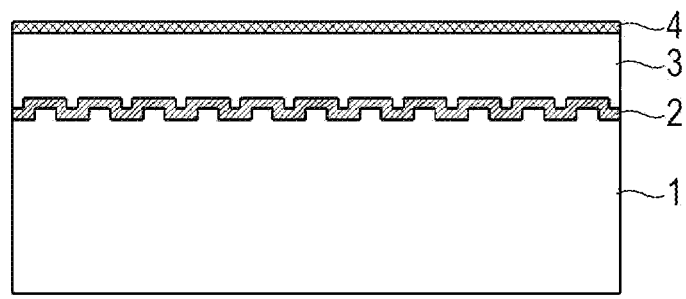
FIG. 2 is a diagram illustrating an example of a single-layer optical disc according to the present invention.

A single-layer optical disc which is a preferred embodiment of the optical disc of the present invention has, for example, a structure in which a light-reflecting layer 2 and a light-transmitting layer 3 are stacked on a substrate 1 and information is recorded and read with a blue laser beam incident from the light-transmitting-layer side, as shown in FIG. 1. In the drawings, corrugated portions schematically represent recording tracks (grooves). The light-transmitting layer 3 is a layer constituted by a laminate containing a cured product of the UV-curable composition of the present invention and has a thickness in a range of 100±10 μm. The thickness of the substrate 1 is about 1.1 mm and the light-reflecting film is a thin film composed of silver or the like. As shown in FIG. 2, an example of a structure including a hard coat layer provided on the above-described structure is also preferred.

Figure 3:
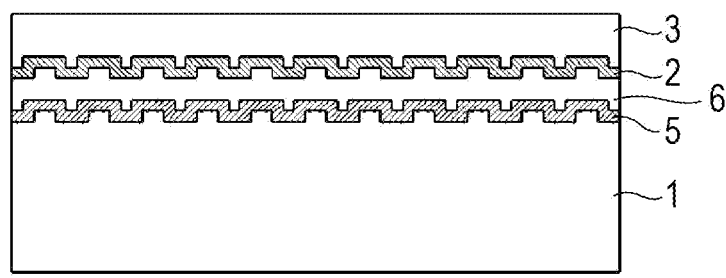
FIG. 3 is a diagram illustrating an example of a double-layer optical disc according to the present invention.

An example of a preferred embodiment of a multilayer optical disc is a double-layer optical disc structure in which a light-reflecting layer 5 and a light-transmitting layer 6 are stacked on a substrate 1, a light-reflecting layer 2 and a light-transmitting layer 3 are stacked on the light-transmitting layer 6, and information is recorded and read with a blue laser beam incident from the light-transmitting-layer-3 side, as shown in FIG. 3. The light-transmitting layer 3 and the light-transmitting layer 6 are layers composed of UV-curable compositions. At least one of the light-transmitting layer 3 and the light-transmitting layer 6 is composed of the UV-curable composition of the present invention. The total thickness of the light-transmitting layer 3 and the light-transmitting layer 6 is in a range of 100±10 μm. The thickness of the substrate 1 is about 1.1 mm and the light-reflecting film is a thin film composed of silver or the like.

Figure 4:
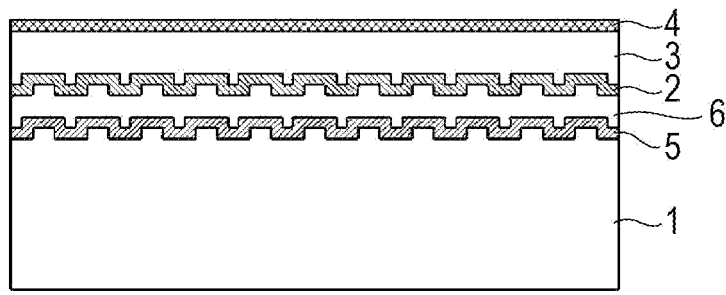
FIG. 4 is a diagram illustrating an example of a double-layer optical disc according to the present invention.

In a double layer optical disc having this structure, recording tracks (grooves) are also formed in a surface of the light-transmitting layer 6. Thus, the light-transmitting layer 6 may have a multilayer structure obtained by stacking a layer of a cured film of a UV-curable composition suitable for forming recording tracks on a layer of a cured film of a UV-curable composition having high adhesiveness. This multilayer optical disc may also include a hard coat layer as the outermost layer, as shown in FIG. 4.

A method for producing an optical disc shown in FIG. 1 will now be described.

First, a substrate 1 having guide grooves, which are called recording tracks (grooves), for tracking a laser beam is prepared by injection molding of a polycarbonate resin. Then a light-reflecting layer 2 is formed on a recording-track-side surface of the substrate 1 by sputter-depositing or vapor-depositing a silver alloy or the like. After a light-transmitting layer composed of a UV-curable composition is formed on the light-reflecting layer 2, the UV-curable composition of the present invention is applied and irradiated with UV from one or both sides of the disc to cure the UV-curable composition and form a light-transmitting layer 3. As a result, an optical disc shown in FIG. 1 is produced.

A method for producing an optical disc shown in FIG. 3 will now be described.

First, a substrate 1 having guide grooves, which are called recording tracks (grooves), for tracking a laser beam is prepared by injection molding of a polycarbonate resin. Then a light-reflecting layer 6 is formed on a recording-track-side surface of the substrate 1 by sputter-depositing or vapor-depositing a silver alloy or the like.

A light-transmitting layer 5 composed of the UV-curable composition of the present invention or any other UV-curable composition is formed thereon. During this process, recording tracks (grooves) are transferred onto the surface by using a mold. The step of transferring the recording tracks (grooves) is as follows. A UV-curable composition is applied to the light-reflecting layer 6 on the substrate 1. A mold for forming recording tracks (grooves) is bonded to the applied UV-curable composition. UV is applied from one or both sides of the bonded disc to cure the UV-curable composition. Then the mold is separated and a light-reflecting layer 2 is formed on the recording-track (groove)-side surface of the light-transmitting layer 5 by sputter-depositing or vapor-depositing a silver alloy or the like. A UV-curable composition is applied to the light-reflecting layer 2 and cured by UV irradiation to form a light-transmitting layer 3. As a result, an optical disc shown in FIG. 3 is produced. An optical disc having a light-reflecting layer constituted by a phase change recording layer can be produced in the same manner.

EXAMPLES

The present invention will now be described in further detail by using Examples below. However, the present invention is not limited to Examples below.

Synthetic Example 1

Into a glass flask equipped with a stirrer, a thermometer, a cooling duct, and a dropper, 20 parts by mass of a perfluoropolyether compound having hydroxyl groups at both ends represented by formula (X-1) below, 20 parts by mass of diisopropyl ether as a solvent, 0.02 parts by mass of p-methoxyphenol as a polymerization inhibitor, and 3.1 parts by mass of triethylamine as a neutralizer were fed. Stirring was started in an air stream and 2.7 parts by mass of acrylic acid chloride was added dropwise over 1 hour while maintaining the interior of the flask at 10° C. After dropwise addition, the resulting mixture was stirred for 1 hour at 10° C., heated and stirred for 1 hour at 30° C., and heated and stirred for 10 hours at 50° C. to induce reaction. Gas chromatography measurement confirmed disappearance of acrylic acid chloride. After 40 parts by mass of diisopropyl ether was added as a solvent, 80 parts by mass of ion exchange water was added and the resulting mixture was stirred, was left to stand, and had a water layer removed therefrom. This washing process was repeated three times. Then 0.02 parts by mass of p-methoxyphenol was added as a polymerization inhibitor and 8 parts by mass of magnesium sulfate was added as a dehydrating agent. The resulting mixture was left to stand for 1 day to completely remove water, and then the dehydrating agent was separated by filtration.

[Chem. 7]

HO—CH$_2$—(X—O)$_{\overline{n}}$X—CH$_2$—OH (X-1)

(in formula, X represents a perfluoromethylene group and a perfluoroethylene group, an average of seven perfluloromethylene groups and an average of eight perfluoroethylene groups are present in a molecule, and the average number of fluorine atoms is 46. The number-average molecular weight determined by GPC is 1,500.)

Next, the solvent was distilled away under a reduced pressure to obtain a monomer represented by structural formula (d1-1-1) below.

[Chem. 8]

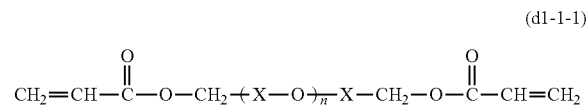

(d1-1-1)

CH$_2$=CH—C(=O)—O—CH$_2$—(X—O)$_{\overline{n}}$—X—CH$_2$—O—C(=O)—CH=CH$_2$ (in formula, X represents a perfluoromethylene group and a perfluoroethylene group, an average of seven perfluloromethylene groups and an average of eight perfluoroethylene groups are present in a molecule, and the average number of fluorine atoms is 46.)

Into another glass flask equipped with a stirrer, a thermometer, a cooling duct, and a dropper, 63.0 parts by mass of methyl isobutyl ketone as a solvent was fed and the temperature was raised to 105° C. in a nitrogen stream under stirring. Then three dropping solutions, namely, 21.5 parts by mass of the monomer (d1-1-1) obtained as above, 41.3 parts by mass of 2-hydroxyethyl methacrylate, and 135.4 parts by mass of an initiator solution containing 9.4 parts by mass of t-butylperoxy-2-ethylhexanoate as a radical polymerization initiator and 126.0 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-1).

To the polymer (P1-1) obtained as above, 74.7 parts by mass of methyl ethyl ketone as a solvent, 0.1 parts by mass of p-methoxyphenol as a polymerization inhibitor, and 0.06 parts by weight of dibutyl tin dilaurate as a urethanation catalyst were fed, stirring was started in an air stream, and 44.8 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (1) having a polymerizable group was obtained. The molecular weight of the fluorine-containing UV-curable resin (1) was measured by GPC (polystyrene equivalent molecular weight). The number-average molecular weight was 2,400, the weight-average molecular weight was 7,100, and the maximum molecular weight was 200,000. The fluorine content in the fluorine-containing UV-curable resin (1) was 11% by mass and the UV-curable group equivalent was 339 g/eq.

Synthetic Example 2

Into a glass flask equipped with a stirrer, a thermometer, a cooling duct, and a dropper, 68.3 parts by mass of methyl isobutyl ketone as a solvent was fed and the temperature was raised to 105° C. in a nitrogen stream under stirring. Then three dropping solutions, namely, 32.3 parts by mass of the monomer (d1-1-1) obtained in Synthetic Example 1, 36.0 parts by mass of 2-hydroxyethyl methacrylate, and 146.7 parts by mass of an initiator solution containing 10.2 parts by mass of t-butylperoxy-2-ethylhexanoate as a radical polymerization initiator and 136.5 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-2).

To the polymer (P1-2) obtained as above, 75.1 parts by mass of methyl ethyl ketone as a solvent, 0.1 parts by mass of p-methoxyphenol as a polymerization inhibitor, and 0.06 parts by weight of tin octylate as a urethanation catalyst were fed, stirring was started in an air stream, and 39.2 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (2) having a polymerizable group was obtained. The molecular weight of the fluorine-containing UV-curable resin (2) was measured by GPC (polystyrene equivalent molecular weight). The number-average molecular weight was 1,700, the weight-average molecular weight was 5,700, and the maximum molecular weight was 100,000. The fluorine content in the fluorine-containing UV-curable resin (2) was 17% by mass and the UV-curable group equivalent was 387 g/eq.

Synthetic Example 3

Into a glass flask equipped with a stirrer, a thermometer, a cooling duct, and a dropper, 107.4 parts by mass of methyl isobutyl ketone as a solvent was fed and the temperature was raised to 115° C. in a nitrogen stream under stirring. Then three dropping solutions, namely, 38.5 parts by mass of the monomer (d1-1-1) obtained in Synthetic Example 1, 32.8 parts by mass of 2-hydroxyethyl methacrylate, and 120.6 parts by mass of an initiator solution containing 10.7 parts by mass of t-butylperoxy-2-ethylhexanoate and 109.9 parts by mass of methyl isobutyl ketone, were set in separate droppers, and simultaneously added to the flask dropwise over 2 hours while maintaining the interior of the flask at 115° C. After the dropwise addition, stirring was conducted for 10 hours at 115° C. and the solvent was distilled away under a reduced pressure to obtain a polymer (P1-3).

To the polymer (P1-3) obtained as above, 106.9 parts by mass of methyl ethyl ketone as a solvent, 0.1 parts by mass of p-methoxyphenol as a polymerization inhibitor, and 0.03 parts by weight of tin octylate as a urethanation catalyst were fed, stirring was started in an air stream, and 35.6 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (3) having a polymerizable group was obtained. The molecular weight of the fluorine-containing UV-curable resin (3) was measured by GPC (polystyrene equivalent molecular weight). The number-average molecular weight was 1,800, the weight-average molecular weight was 5,900, and the maximum molecular weight was 80,000. The fluorine content in the fluorine-containing UV-curable resin (3) was 20% by mass and the UV-curable group equivalent was 423 g/eq.

Synthetic Example 4

Into a glass flask equipped with a stirrer, a thermometer, a cooling duct, and a dropper, 44.2 parts by mass of methyl isobutyl ketone as a solvent was fed and the temperature was raised to 105° C. in a nitrogen stream under stirring. Then three dropping solutions, namely, 38.5 parts by mass of the monomer (d1-1-1) obtained in Synthetic Example 1, 32.8 parts by mass of 2-hydroxyethyl methacrylate, and an initiator solution containing 10.7 parts by mass of t-butylperoxy-2-ethylhexanoate as a radical polymerization initiator and 88.3 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-4).

To the polymer (P1-4) obtained as above, 106.9 parts by mass of methyl ethyl ketone as a solvent, 0.1 parts by mass of p-methoxyphenol as a polymerization inhibitor, and 0.03 parts by weight of tin octylate as a urethanation catalyst were fed, stirring was started in an air stream, and 35.6 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (4) having a polymerizable group was obtained. The molecular weight of the fluorine-containing UV-curable resin (4) was measured by GPC (polystyrene equivalent molecular weight). The number-average molecular weight was 3,000, the weight-average molecular weight was 25,000, and the maximum molecular weight was 1,500,000. The fluorine content in the fluorine-containing UV-curable resin (4) was 20% by mass and the UV-curable group equivalent was 423 g/eq. The chart diagram of the IR spectrum of the fluorine-containing UV-curable resin (4) is shown in FIG. 1 and the chart diagram of $^{13}$C-NMR is shown in FIG. 2.

Synthetic Example 5

Into a glass flask equipped with a stirrer, a thermometer, a cooling duct, and a dropper, 29.1 parts by mass of methyl isobutyl ketone as a solvent was fed and the temperature was raised to 105° C. in a nitrogen stream under stirring. Then three dropping solutions, namely, 38.5 parts by mass of the monomer (d1-1-1) obtained in Example 1, 32.8 parts by mass of 2-hydroxyethyl methacrylate, and an initiator solution containing 10.7 parts by mass of t-butylperoxy-2-ethylhexanoate and 58.1 parts by mass of methyl isobutyl ketone, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-5).

To the polymer (P1-5) obtained as above, 106.9 parts by mass of methyl ethyl ketone as a solvent, 0.1 parts by mass of p-methoxyphenol as a polymerization inhibitor, and 0.03 parts by weight of tin octylate as a urethanation catalyst were fed, stirring was started in an air stream, and 35.6 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (5) having a polymerizable group was obtained. The molecular weight of the fluorine-containing UV-curable resin (5) was measured by GPC (polystyrene equivalent molecular weight). The number-average molecular weight was 3,200, the weight-average molecular weight was 87,000, and the maximum molecular weight was 7,000,000. The fluorine content in the fluorine-containing UV-curable resin (5) was 20% by mass and the UV-curable group equivalent was 423 g/eq.

Synthetic Example 6

Into a glass flask equipped with a stirrer, a thermometer, a cooling duct, and a dropper, 36.8 parts by mass of methyl isobutyl ketone as a solvent was fed and the temperature was raised to 105° C. in a nitrogen stream under stirring. Then three dropping solutions, namely, 42.8 parts by mass of the monomer (d1-1-1) obtained in Example 1, 30.7 parts by mass of 2-hydroxyethyl methacrylate, and an initiator solution containing 11.0 parts by mass of t-butylperoxy-2-ethylhexanoate as a radical polymerization initiator and 73.5 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-6).

To the polymer (P1-6) obtained as above, 107.0 parts by mass of methyl ethyl ketone as a solvent, 0.1 parts by mass of p-methoxyphenol as a polymerization inhibitor, and 0.03 parts by weight of tin octylate as a urethanation catalyst were fed, stirring was started in an air stream, and 33.5 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (6) having a polymerizable group was obtained. The molecular weight of the fluorine-containing UV-curable resin (6) was measured by GPC (polystyrene equivalent molecular weight). The number-average molecular weight was 2,500, the weight-average molecular weight was 14,000, and the maximum molecular weight was 600,000. The fluorine content in the fluorine-containing UV-curable resin (6) was 23% by mass and the UV-curable group equivalent was 450 g/eq.

Synthetic Example 7

Into a glass flask equipped with a stirrer, a thermometer, a cooling duct, and a dropper, 32.3 parts by mass of methyl isobutyl ketone as a solvent was fed and the temperature was raised to 105° C. in a nitrogen stream under stirring. Then three dropping solutions, namely, 42.8 parts by mass of the monomer (d1-1-1) obtained in Example 1, 29.0 parts by mass of 2-hydroxyethyl acrylate, and an initiator solution containing 7.1 parts by mass of t-butylperoxy-2-ethylhexanoate as a radical polymerization initiator and 75.5 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-7).

To the polymer (P1-7) obtained as above, 107.0 parts by mass of methyl ethyl ketone as a solvent, 0.1 parts by mass of p-methoxyphenol as a polymerization inhibitor, and 0.03 parts by weight of tin octylate as a urethanation catalyst were fed, stirring was started in an air stream, and 21.6 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (7) having a polymerizable group was obtained. The molecular weight of the fluorine-containing UV-curable resin (7) was measured by GPC (polystyrene equivalent molecular weight). The number-average molecular weight was 3,100, the weight-average molecular weight was 7,300, and the maximum molecular weight was 140,000. The fluorine content in the fluorine-containing UV-curable resin (7) was 23% by mass and the UV-curable group equivalent was 429 g/eq.

Synthetic Example 8

Into a glass flask equipped with a stirrer, a thermometer, a cooling duct, and a dropper, 81.9 parts by mass of methyl isobutyl ketone as a solvent was fed and the temperature was raised to 105° C. in a nitrogen stream under stirring. Then three dropping solutions, namely, 30.3 parts by mass of the monomer (d1-1-1) obtained in Example 1, 51.6 parts by mass of a polyoxyalkylene-containing methacrylate (n in the formula is 5 on average) represented by formula (d2-1) below, and an initiator solution containing 12.2 parts by mass of t-butylperoxy-2-ethylhexanoate as a radical polymerization initiator and 69.9 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-8).

[Chem. 9]

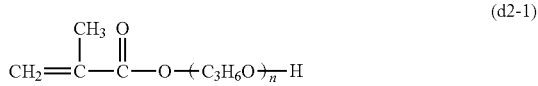

(d2-1)

To the polymer (P1-8) obtained as above, 70.7 parts by mass of methyl ethyl ketone as a solvent, 0.1 parts by mass of p-methoxyphenol as a polymerization inhibitor, and 0.06 parts by weight of tin octylate as a urethanation catalyst were fed, stirring was started in an air stream, and 18.1 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (8) having a polymerizable group was obtained. The molecular weight of the fluorine-containing UV-curable resin (8) was measured by GPC (polystyrene equivalent molecular weight). The number-average molecular weight was 1,800, the weight-average molecular weight was 5,400, and the maximum molecular weight was 90,000. The fluorine content in the fluorine-containing UV-curable resin (8) was 17% by mass and the UV-curable group equivalent was 780 g/eq.

Synthetic Example 9

Into a glass flask equipped with a stirrer, a thermometer, a cooling duct, and a dropper, 56.2 parts by mass of methyl isobutyl ketone as a solvent was fed and the temperature was raised to 105° C. in a nitrogen stream under stirring. Then four dropping solutions, namely, 38.7 parts by mass of the monomer (d1-1-1) obtained in Example 1, 16.6 parts by mass of 2-hydroxyethyl methacrylate, 21.9 parts by mass of an unsaturated fatty acid hydroxyalkyl ester-modified ∈-caprolactone (n in the formula is 1 on average) represented by formula (d2-2) below, and an initiator solution containing 11.6 parts by mass of t-butylperoxy-2-ethylhexanoate as a radical polymerization initiator and 112.3 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and a solution of a polymer (P1-9) was obtained.

[Chem. 10]

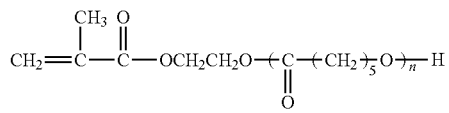

(d2-2)

To the polymer (P1-9) obtained as above, 0.1 parts by mass of p-methoxyphenol as a polymerization inhibitor and 0.06 parts by weight of tin octylate as a urethanation catalyst were fed, stirring was started in an air stream, and 30.3 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (9) having a polymerizable group was obtained. The molecular weight of the fluorine-containing UV-curable resin (9) was measured by GPC (polystyrene equivalent molecular weight). The number-average molecular weight was 2,100, the weight-average molecular weight was 15,100, and the maximum molecular weight was 600,000. The fluorine content in the fluorine-containing UV-curable resin (9) was 20% by mass and the UV-curable group equivalent was 500 g/eq.

Synthetic Example 10

Into a glass flask equipped with a stirrer, a thermometer, a cooling duct, and a dropper, 20 parts by mass of a perfluoropolyether compound (X-1) having hydroxyl groups at both ends represented by formula (X-1) below, 10 parts by mass of diisopropyl ether as a solvent, 0.006 parts by mass of p-methoxyphenol as a polymerization inhibitor, and 3.3 parts by mass of triethylamine as a neutralizer were fed. Stirring was started in air stream and 3.1 parts by mass of methacrylic acid chloride was added dropwise over 2 hour while maintaining the interior of the flask at 10° C. After dropwise addition, the resulting mixture was stirred for 1 hour at 10° C., heated and stirred for 1 hour at 30° C., and heated and stirred for 10 hours at 50° C. to induce reaction. Gas chromatography measurement confirmed disappearance of methacrylic acid chloride.

[Chem. 11]

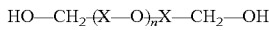

(X-1)

(in formula, X represents a perfluoromethylene group and a perfluoroethylene group, an average of seven perfluloromethylene groups and an average of eight perfluoroethylene groups are present in a molecule, and the average number of fluorine atoms is 46. The number-average molecular weight determined by GPC is 1,500.)

After 72 parts by mass of diisopropyl ether was added as a solvent, 72 parts by mass of ion exchange water was added and the resulting mixture was stirred, was left to stand, and had a water layer removed therefrom. This washing process was repeated three times. Then 8 parts by mass of magnesium sulfate was added as a dehydrating agent. The resulting mixture was left to stand for 1 day to completely remove water, and then the dehydrating agent was separated by filtration to obtain a filtrate. The solvent in the filtrate was distilled away under a reduced pressure. As a result, 20.8 parts by mass of a monomer (d1-2-1) represented by formula below was obtained as a compound (A).

[Chem. 12]

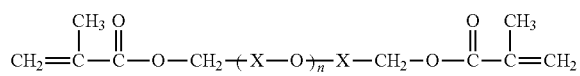

(d1-2-1)

(in formula, X represents a perfluoromethylene group and a perfluoroethylene group, an average of seven perfluloromethylene groups and an average of eight perfluoroethylene groups are present in a molecule, and the average number of fluorine atoms is 46.)

Into a glass flask equipped with a stirrer, a thermometer, a cooling duct, and a dropper, 57.3 parts by mass of methyl isobutyl ketone as a solvent was fed and the temperature was raised to 105° C. in a nitrogen stream under stirring. Then three dropping solutions, namely, 19.6 parts by mass of the monomer (d1-2-1) obtained as above, 37.7 parts by mass of 2-hydroxyethyl acrylate, and an initiator solution containing 8.6 parts by mass of t-butylperoxy-2-ethylhexanoate as a radical polymerization initiator and 115.0 parts by mass of methyl isobutyl ketone as a solvent, were set in separate droppers, and simultaneously added to the flask dropwise over 2 hours while maintaining the interior of the flask at 105° C. After the dropwise addition, stirring was conducted for 10 hours at 105° C. and the solvent was distilled away under a reduced pressure to obtain a polymer (P1-10).

To the polymer (P1-10) obtained as above, 97.3 parts by mass of methyl ethyl ketone as a solvent, 0.05 parts by mass of p-methoxyphenol as a polymerization inhibitor, and 0.04 parts by weight of tin octylate as a urethanation catalyst were fed, stirring was started in an air stream, and 39.7 parts by mass of 2-acryloyloxyethyl isocyanate was added dropwise over 1 hour while maintaining a temperature of 60° C. After the dropwise addition, the resulting mixture was stirred for 1 hour at 60° C. and heated and stirred for 5 hours at 80° C. to induce reaction. IR spectrum measurement confirmed disappearance of absorption peaks attributable to isocyanate groups. The resulting mixture was diluted with methyl ethyl ketone as a solvent and filtered to remove insoluble matter in the solution. As a result, a methyl ethyl ketone solution containing 20% by mass of a fluorine-containing UV-curable resin (10) having a polymerizable group was obtained. The molecular weight of the radically polymerizable resin (10) was measured by GPC (polystyrene equivalent molecular weight). The number-average molecular weight was 2,200, the weight-average molecular weight was 6,200, and the maximum molecular weight was 100,000. The fluorine content in the fluorine-containing UV-curable resin (10) was 11% by mass and the UV-curable group equivalent was 357 g/eq.

Synthetic Example 11

Into a glass flask equipped with a stirrer, a thermometer, a cooling duct, and a dropper, 69.0 parts by mass of methyl isobutyl ketone as a solvent was fed and the temperature was raised to 105° C. in a nitrogen stream under stirring. Then two dropping solutions, namely, 137.8 parts by weight of a monomer solution containing 40.0 parts by mass of a fluorinated alkyl-containing acrylate represented by formula (Y-1) below, 28.8 parts by mass of 2-hydroxyethyl methacrylate, and 69.0 parts by mass of methyl isobutyl ketone as a solvent and 25.9 parts by mass of an initiator solution containing 3.4 parts by mass of t-butylperoxy-2-ethylhexanoate as a radical polymerization initiator and 22.5 parts by mass of methyl isobutyl ketone as a solvent, were set in separate droppers, and simultaneously added to the flask dropwise over 3 hours while maintaining the interior of the flask at 105° C. After the dropwise addition, stirring was conducted for 10 hours at 105° C. and a polymer solution was obtained as a result.

[Chem. 13]

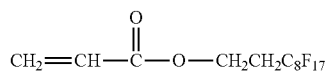
(Y-1)

To the polymer solution obtained as above, 0.1 parts by mass of p-methoxyphenol as a polymerization inhibitor and 0.05 parts by weight of tin octylate as a urethanation catalyst were fed and 31.2 parts by mass of 2-acryloyloxyethyl isocyanate was added dropwise in an air stream in 1 hour while maintaining a temperature of 60° C. After the dropwise addition, the resulting mixture was stirred for 1 hour at 60° C. and heated and stirred for 10 hours at 80° C. to induce reaction. IR spectrum measurement confirmed disappearance of isocyanate groups. The resulting mixture was diluted with methyl isobutyl ketone as a solvent and filtered to remove insoluble matter in the solution. As a result, a methyl isobutyl ketone solution containing 20% by mass of a fluorine-containing UV-curable resin (11) having a polymerizable group was obtained. The molecular weight of the fluorine-containing UV-curable resin (11) was measured by GPC (polystyrene equivalent molecular weight). The number-average molecular weight was 3,000, the weight-average molecular weight was 7,000, and the maximum molecular weight was 40,000. The fluorine content in the fluorine-containing UV-curable resin (11) was 25% by mass and the UV-curable group equivalent was 452 g/eq.

Each of the compositions having blends shown in Tables 1 to 4 below (figures of the compositions in the tables are in terms of parts by mass) was heated at 60° C. for 3 hours and dissolved to prepare UV-curable compositions of Examples 1 to 24 and Comparative Examples 1 to 3. The contents of fluorine-containing UV-curable resins (1) to (10) in the tables is in terms of parts by mass as a 20% by mass solution obtained in Synthetic Examples described above. Each of the compositions was evaluated as below and the results are also indicated in the tables.

<Method for Measuring Viscosity>

The viscosity of each UV-curable composition at 25° C. was measured with a B-type viscometer (BM-type model produced by TOKYO KEIKI INC.).

<Method for Measuring Elastic Modulus>

A UV-curable composition was applied to a glass plate so that the thickness of the cured coating film was to be 100±10 μm, and then cured by using a metal halide lamp (equipped with a cold mirror, lamp output: 120 W/cm) in a nitrogen atmosphere at 500 mJ/cm$^2$. The elastic modulus of the cured coating film was measured with an automatic dynamic viscoelastic meter produced by TA Instruments and the dynamic elastic modulus E' at 30° C. was assumed to be the elastic modulus.

(Compatibility)

A blend composition that achieved uniform compatibility is marked by A and a blend composition that underwent phase separation or clouding is marked by X.

<Conditions for Preparing Optical Discs for Signal Evaluation>

A polycarbonate substrate having a diameter of 120 mm and a thickness of 1.1 mm was prepared. Sputter-deposition was conducted with a silver alloy target GBDO5 (a silver-bismuth alloy containing silver as a main component) produced by KOBELCO RESEARCH INSTITUTE, INC., to form a film 20 to 40 nm in thickness. DAICURE CLEAR SD-8802 produced by DIC Corporation was applied to the resulting silver alloy reflecting film on the substrate by using an application tester produced by Origin ELECTRIC CO., LTD., so that the thickness after cure would be 97±2 μm. UV irradiation was conducted with a xenon flash lamp (model FUV-201WJ02) produced by USHIO INC., under conditions that allow pre-curing to complete in two shots (charge voltage: 3420 V) and main curing to complete in ten shots (charge voltage: 3420 V).

Each of the compositions shown in Table 1 was applied to the cured product by using an application tester produced by Origin ELECTRIC CO., LTD., so that the thickness after cure would be about 3 μm. Cure by UV irradiation was conducted with a xenon flash lamp (model FUV-201WJ02) produced by USHIO INC., under conditions that allow main curing to complete in ten shots (charge voltage: 3420 V). As a result, a sample disc for testing was obtained.

<Preparation of Artificial Fingerprint Solution>

To 10 parts by mass of a diluent methoxypropanol, 1 part by mass of triolein was added, and 0.4 parts by mass of Kanto loam, which is a test dust 1, class 11 defined in JIS Z8901 was further added, followed by stirring, to prepare an artificial fingerprint solution.

<Preparation of a Master for Transferring Artificial Fingerprint Pattern>

About 1 ml of artificial fingerprint solution was sampled under stirring and applied to a polycarbonate substrate (120 mm in diameter and 1.2 mm in thickness) by spin coating. This substrate was heated at 60° C. for 3 minutes to remove methoxypropanol to obtain a master for transferring an artificial fingerprint pattern.

<Transfer of Artificial Fingerprint Pattern>

A smaller end surface (24 mm in diameter) of a No. 9 silicone rubber plug was evenly polished with an abrasive paper (CC 150-Cw produced by NIHON KENSHI CO., LTD.) and used as an artificial fingerprint transfer material. The end surface of the artificial fingerprint transfer material was pressed against the master for 10 seconds at a load of 126 N to transfer the artificial fingerprint solution components onto the end surface of the transfer material. The artificial fingerprint solution components were transferred onto a disc surface, on which the UV-curable resin composition was formed, at a position about 37 mm from the center of the disc in a radial direction by pressing the end surface of the transfer material, on which the artificial fingerprint solution components were adhered, at a load of 126 N for 10 seconds.

<Artificial Fingerprint Adherence Test>

Each disc sample with the artificial fingerprint components transferred thereto was analyzed with a digital microscope VHX-200 produced by KEYENCE CORPORATION to measure the droplet size at a magnification of ×1000.

The droplet size was determined by measuring the diameter of ten large droplets in an image and averaging the results. Samples with a droplet size of 15 micrometers or less are marked by A and those with a droplet size of 15 micrometer or more are marked by X.

<Measurement of Error Rate of Optical Disc>

Each sample disc onto which the artificial fingerprint solution was adhered was analyzed with BD-MASTER produced by Pulsetec Industrial Co., Ltd., to measure Randam SER at 36 to 38 mm.

The error rate ratio of Randam SER (after adherence of artificial fingerprint/before adherence of artificial fingerprint) was calculated.

Samples with an error rate ratio of Randam SER of 50 or less are marked by A and those with 50 or less are marked by X.

<Wiping Test>

After measuring SER, a stack of eight sheets of facial tissue (produced by NIPPON PAPER CRECIA Co., Ltd.) was interposed between a larger end surface (36 mm in diameter) of a No. 12 rubber plug and the sample disc on which the artificial fingerprint solution was adhered at 25 N and gradually moved to wipe off the artificial fingerprints.

This wiping test was repeated 5 times and each sample disc was analyzed with BD-MASTER produced by Pulsetec Industrial Co., Ltd., to measure Randam SER at 36 to 38 mm. The Randam SER ratio (after wiping/before adherence of artificial fingerprint) was calculated. Samples with a ratio of 10 or less are marked by A and those with a ratio of 10 or more are marked by X.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Acrylate oligomer | V-5530 | 7 | 7 | 9.5 |  |  | 7 | 7 |
|  | PH-6019 |  |  |  | 7 |  |  |  |
|  | EB-1290 |  |  |  |  | 7 |  |  |
| Acrylate monomer | TMPTA | 59 | 59 | 51.5 | 59 | 59 | 59 | 59 |
|  | NPGDA |  |  | 32 |  |  |  |  |
|  | DPGDA | 25 | 25 |  | 25 | 25 | 25 | 25 |
| Photopolymerization initiator | Irgacure 184 | 9 |  | 9 | 9 | 9 | 9 | 9 |
|  | Irgacure 907 |  | 9 |  |  |  |  |  |
| F-containing curable resin | (1) (Syn. Ex. 1) | 2.5 | 2.5 | 2.5 | 2.5 | 2.5 | 1.5 | 5 |
| Viscosity (25° C.) [mPa·s] |  | 55 | 57 | 58 | 58 | 60 | 56 | 53 |
| Elastic modulus (25° C.) [MPa] |  | 2500 | 2600 | 3000 | 2600 | 2700 | 2600 | 2400 |
| Compatibility |  | A | A | A | A | A | A | A |
| Artificial fingerprint adherence test | Droplet size [μm] | 9.7 | 9.2 | 9.5 | 9.1 | 9.6 | 9.9 | 8.8 |
|  | Evaluation | A | A | A | A | A | A | A |
| Randam SER | Before adherence | $4.8 \times 10^{-5}$ | $2.8 \times 10^{-5}$ | $2.6 \times 10^{-5}$ | $4.7 \times 10^{-5}$ | $4.7 \times 10^{-5}$ | $3.0 \times 10^{-5}$ | $2.5 \times 10^{-5}$ |
|  | After adherence | $5.7 \times 10^{-4}$ | $3.5 \times 10^{-4}$ | $4.6 \times 10^{-4}$ | $5.7 \times 10^{-4}$ | $6.6 \times 10^{-4}$ | $8.9 \times 10^{-4}$ | $2.6 \times 10^{-4}$ |
|  | Ratio between before and after adherence | 12 | 13 | 18 | 12 | 14 | 30 | 10 |
|  | Evaluation before and after adherence | A | A | A | A | A | A | A |
| Wipe-off test | After 5 times of wiping | $8.3 \times 10^{-5}$ | $7.0 \times 10^{-5}$ | $8.1 \times 10^{-5}$ | $1.3 \times 10^{-4}$ | $9.9 \times 10^{-5}$ | $1.5 \times 10^{-4}$ | $5.6 \times 10^{-5}$ |
|  | Ratio relative to initial value | 1.7 | 2.5 | 3.1 | 2.7 | 2.1 | 5.1 | 2.2 |
|  | Wipe-off property evaluation | A | A | A | A | A | A | A |

Ex.: Example

TABLE 2

|  |  | Ex.* 8 | Ex. 9 | Ex. 10 | Ex. 11 | Ex. 12 | Ex. 13 | Ex. 14 |
|---|---|---|---|---|---|---|---|---|
| Acrylate oligomer | V-5530 | 7 | 7 | 7 | 7 | 7 | 7 | 7 |
| Acrylate monomer | TMPTA | 59 | 59 | 59 | 59 | 59 | 59 | 59 |
|  | DPGDA | 25 | 25 | 25 | 25 | 25 | 25 | 25 |
| Photopolymerization initiator | Irgacure 184 | 9 | 9 | 9 | 9 | 9 | 9 | 9 |
| F-containing curable resin | (1) (Syn. Ex.** 1) | 10 |  |  |  |  |  |  |
|  | (2) (Syn. Ex. 2) |  | 2.5 |  |  |  |  |  |
|  | (3) (Syn. Ex. 3) |  |  | 2.5 |  |  |  |  |
|  | (4) (Syn. Ex. 4) |  |  |  | 2.5 |  |  |  |

TABLE 2-continued

|  |  | Ex.* 8 | Ex. 9 | Ex. 10 | Ex. 11 | Ex. 12 | Ex. 13 | Ex. 14 |
|---|---|---|---|---|---|---|---|---|
|  | (5) (Syn. Ex. 5) |  |  |  |  | 2.5 |  |  |
|  | (6) (Syn. Ex. 6) |  |  |  |  |  | 2.5 |  |
|  | (7) (Syn. Ex. 7) |  |  |  |  |  |  | 2.5 |
| Viscosity (25° C.) [mPa·s] |  | 50 | 55 | 55 | 55 | 55 | 55 | 55 |
| Elastic modulus (25° C.) [MPa] |  | 2400 | 2500 | 2500 | 2500 | 2600 | 2500 | 2400 |
| Compatibility |  | A | A | A | A | A | A | A |
| Artificial fingerprint adherence test | Droplet size [μm] | 8.7 | 11 | 10.2 | 9.4 | 9.5 | 9.9 | 9.3 |
|  | Evaluation | A | A | A | A | A | A | A |
| Randam SER | Before adherence | $3.1 \times 10^{-5}$ | $2.8 \times 10^{-5}$ | $2.4 \times 10^{-5}$ | $3.0 \times 10^{-5}$ | $2.6 \times 10^{-5}$ | $3.2 \times 10^{-5}$ | $4.2 \times 10^{-5}$ |
|  | After adherence | $2.2 \times 10^{-4}$ | $4.7 \times 10^{-4}$ | $6.8 \times 10^{-4}$ | $5.0 \times 10^{-4}$ | $6.4 \times 10^{-4}$ | $4.2 \times 10^{-4}$ | $7.0 \times 10^{-4}$ |
|  | Ratio between before and after adherence | 7 | 17 | 28 | 17 | 25 | 13 | 17 |
|  | Evaluation before and after adherence | A | A | A | A | A | A | A |
| Wipe-off test | After 5 times of wiping | $4.8 \times 10^{-5}$ | $8.4 \times 10^{-5}$ | $7.2 \times 10^{-5}$ | $9.9 \times 10^{-5}$ | $6.5 \times 10^{-5}$ | $5.9 \times 10^{-5}$ | $6.4 \times 10^{-5}$ |
|  | Ratio relative to initial value | 1.6 | 3.1 | 3.0 | 3.3 | 2.5 | 1.8 | 1.5 |
|  | Wipe-off property evaluation | A | A | A | A | A | A | A |

Ex.*: Example
Syn. Ex.**: Synthetic Example

TABLE 3

|  |  | Ex.* 15 | Ex. 16 | Ex. 17 | Ex. 18 | Ex. 19 | Ex. 20 | Ex. 21 |
|---|---|---|---|---|---|---|---|---|
| Acrylate oligomer | V-5530 | 7 | 7 | 7 | 7 | 7 | 20 | 7 |
| Acrylate monomer | TMPTA | 59 | 59 | 59 |  |  | 40 | 29 |
|  | EO-TMPTA |  |  |  | 59 |  |  | 30 |
|  | EO-PETA |  |  |  |  | 59 |  |  |
|  | NPGDA |  |  |  |  | 32 |  |  |
|  | DPGDA | 25 | 25 | 25 | 25 |  | 31 | 25 |
| Photopolymerization initiator | Irgacure 184 | 9 | 9 | 9 |  | 9 | 9 | 9 |
|  | Irgacure 907 |  |  |  | 9 |  |  |  |
| F-containing curable resin | (1) (Syn. Ex.** 1) |  |  |  | 2.5 | 2.5 | 2.5 | 2.5 |
|  | (8) (Syn. Ex. 8) | 2.5 |  |  |  |  |  |  |
|  | (9) (Syn. Ex. 9) |  | 2.5 |  |  |  |  |  |
|  | (10) (Syn. Ex. 10) |  |  | 2.5 |  |  |  |  |
| Viscosity (25° C.) [mPa·s] |  | 55 | 55 | 55 | 40 | 68 | 130 | 46 |
| Elastic modulus (25° C.) [MPa] |  | 2600 | 2500 | 2500 | 2000 | 1800 | 2400 | 2400 |
| Compatibility |  | A | A | A | A | A | A | A |
| Artificial fingerprint adherence test | Droplet size [μm] | 9.7 | 9.9 | 10.4 | 9.6 | 9.9 | 9.7 | 9.7 |
|  | Evaluation | A | A | A | A | A | A | A |
| Randam SER | Before adherence | $3.7 \times 10^{-5}$ | $4.1 \times 10^{-5}$ | $5.1 \times 10^{-5}$ | $3.1 \times 10^{-5}$ | $3.7 \times 10^{-5}$ | $5.0 \times 10^{-5}$ | $3.4 \times 10^{-5}$ |
|  | After adherence | $6.3 \times 10^{-4}$ | $7.9 \times 10^{-4}$ | $6.8 \times 10^{-4}$ | $6.2 \times 10^{-4}$ | $5.6 \times 10^{-4}$ | $7.2 \times 10^{-4}$ | $7.4 \times 10^{-4}$ |
|  | Ratio between before and after adherence | 17 | 19 | 13 | 20 | 15 | 14 | 22 |
|  | Evaluation before and after adherence | A | A | A | A | A | A | A |
| Wipe-off test | After 5 times of wiping | $1.3 \times 10^{-4}$ | $2.1 \times 10^{-4}$ | $9.6 \times 10^{-5}$ | $7.5 \times 10^{-5}$ | $8.2 \times 10^{-5}$ | $1.0 \times 10^{-4}$ | $8.7 \times 10^{-5}$ |
|  | Ratio relative to initial value | 3.5 | 5.2 | 1.9 | 2.4 | 2.2 | 2.0 | 2.6 |
|  | Wipe-off property evaluation | A | A | A | A | A | A | A |

Ex.*: Example
Syn. Ex.**: Synthetic Example

TABLE 4

|  |  | Ex. 22 | Ex. 23 | Ex. 24 | C. Ex. 1 | C. Ex. 2 | C. Ex. 3 |
|---|---|---|---|---|---|---|---|
| Acrylate oligomer | V-5530 |  | 3 |  | 7 | 7 | 7 |
| Acrylate monomer | TMPTA | 30 | 30 |  | 59 | 59 | 59 |
|  | EO-PETA |  |  | 60 |  |  |  |
|  | PETA | 33 | 30 |  |  |  |  |
|  | NPGDA | 28 | 28 | 15 |  |  |  |
|  | DPGDA |  |  | 22 | 25 | 25 | 25 |
| Photopolymerization initiator | Irgacure 184 | 9 | 9 | 9 | 9 | 9 | 9 |
| F-containing curable resin | (1) (Syn. Ex. 1) | 2.5 | 2.5 | 2.5 |  |  |  |
|  | (11) (Syn. Ex. 11) |  |  |  | 2.5 |  |  |
| Silane compound | Tegorad 2200N |  |  |  |  | 0.3 |  |
| Viscosity (25° C.) [mPa · s] |  | 38 | 46 | 35 | 55 | 55 | 55 |
| Elastic modulus (25° C.) [MPa] |  | 3100 | 3200 | 1700 | 2600 | 2800 | 2700 |
| Compatibility |  | A | A | A | A | A | A |
| Artificial fingerprint adherence test | Droplet size [μm] | 9.9 | 9.7 | 8.8 | 12.6 | 15.3 | 18.9 |
|  | Evaluation | A | A | A | A | X | X |
| Randam SER | Before adherence | $4.3 \times 10^{-5}$ | $3.6 \times 10^{-5}$ | $2.1 \times 10^{-5}$ | $4.8 \times 10^{-5}$ | $2.7 \times 10^{-5}$ | $4.9 \times 10^{-5}$ |
|  | After adherence | $6.2 \times 10^{-4}$ | $5.9 \times 10^{-4}$ | $4.1 \times 10^{-4}$ | $1.1 \times 10^{-3}$ | $2.2 \times 10^{-3}$ | Immeasurable |
|  | Ratio between before and after adherence | 14 | 16 | 20 | 23 | 82 | — |
|  | Evaluation before and after adherence | A | A | A | A | X | X |
| Wipe-off test | After 5 times of wiping | $7.9 \times 10^{-5}$ | $6.5 \times 10^{-5}$ | $6.9 \times 10^{-5}$ | $5.6 \times 10^{-4}$ | $1.5 \times 10^{-4}$ | Immeasurable |
|  | Ratio relative to initial value | 1.8 | 1.8 | 3.3 | 11.7 | 5.7 | — |
|  | Wipe-off property evaluation | A | A | A | X | A | X |

Ex.*: Example
C. Ex.**: Comparative Example
Syn. Ex.***: Synthetic Example

Descriptions used in the tables are as follows.

V-5530: an epoxy acrylate with acrylic acid directly bonded to a glycidyl group of a bisphenol A epoxy resin, produced by DIC Corporation PH-6019: trifunctional aliphatic urethane acrylate produced by Cognis Japan EB-1290: hexafunctional aliphatic urethane acrylate produced by DAICEL-CYTEC COMPANY LTD.

TMPTA: trimethylolpropane triacrylate

EO-TMPTA: ethylene oxide (3 mol)-modified trimethylolpropane triacrylate

EO-PETA: ethylene oxide (4 mol)-modified pentaerythritol tetraacrylate

PETA: pentaerythritol tetraacrylate

NPGDA: neopentyl glycol diacrylate

DPGDA: dipropylene glycol diacrylate

Irgacure 184: 1-hydroxycyclohexylphenyl ketone produced by Ciba Japan

Irgacure 907: 2-methyl-1-(4-methylthiophenyl)-2-morpholinopropan-1-on

Tegorad 2200N: reactive polysiloxane produced by Evonik Degussa Japan

In Examples 1 to 17, the UV-curable composition had good compatibility and the droplet size of the artificial fingerprint solution was satisfactorily small, i.e., 15 micrometers or less. Sufficient and satisfactory signal characteristics were obtained at this level even when read/write operation was conducted after adhering fingerprints to a light-transmitting layer composed of this composition in a recording blu-ray disc such as BD-R and BD-RE.

In Comparative Example 1, the wipe-off property was poor. In Comparative Example 2, the droplet size of the artificial fingerprints was as large as 15 micrometers or more.

In Comparative Example 3, adherence of artificial fingerprints was poor and the wipe-off property was also poor.

| Reference Signs List | |
|---|---|
| 1 | substrate |
| 2 | light-reflecting layer |
| 3 | light-transmitting layer |
| 4 | hard coat layer |
| 5 | light-reflecting layer |
| 6 | intermediate light-transmitting layer |

The invention claimed is:

1. An optical disc, comprising:
a substrate;
a light-reflecting layer, disposed above the substrate;
an information recording layer, disposed above the light-reflecting layer;
a light-transmitting layer, disposed above the information recording layer; and
a hard coat layer as an outermost layer, disposed above the light transmitting layer,
wherein information is read from or recorded onto the optical disc with a blue laser beam incident from the hard coat layer side, and the hard coat layer is formed of a cured product of a UV-curable composition,
wherein the UV-curable composition comprises a fluorine-containing UV-curable resin containing a poly(perfluoroalkylene ether) chain and a UV-curable group, and
wherein the fluorine-containing UV-curable resin is a fluorine-containing UV-curable resin obtained by allowing a polymer (P1), which is obtained by copolymerizing a compound (d1) having a structural segment including a poly(perfluoroalkylene ether) chain having radically polymerizable unsaturated groups at both ends and a radically polymerizable unsaturated monomer (d2) having a reactive functional group (R1) as essential monomer components, to react with a compound (d3) having a functional group (R2) reactive to the functional group (R1) and a UV-curable group.

2. The optical disc according to claim 1, wherein the UV-curable composition includes 0.1 to 3% by mass of the fluorine-containing UV-curable resin.

3. The optical disc according to claim 1, wherein the UV-curable composition includes 30 to 70% by mass of a trifunctional (meth)acrylate monomer.

4. An optical disc, comprising:
a substrate;
a light-reflecting layer, disposed above the substrate;
an information recording layer, disposed above the light-reflecting layer;
a light-transmitting layer, disposed above the information recording layer; and
a hard coat layer as an outermost layer, disposed above the light transmitting layer,
wherein information is read from or recorded onto the optical disc with a blue laser beam incident from the hard coat layer side, and the hard coat layer is formed of a cured product of a UV-curable composition,
wherein the UV-curable composition comprises a fluorine-containing UV-curable resin containing a poly(perfluoroalkylene ether) chain and a UV-curable group, and
wherein the fluorine-containing UV-curable resin is a fluorine-containing UV-curable resin obtained by allowing a polymer (P2) of a radically polymerizable unsaturated monomer (d2) having a reactive functional group (R1) to react with a compound (d1') having a poly(perfluoroalkylene ether) chain having, at both ends, functional groups (R2) reactive to the reactive functional group (R1) and with a compound (d3) having a functional group (R2) reactive to the functional group (R1) and a UV-curable group.

5. The optical disc according to claim 4, wherein the UV-curable composition includes 0.1 to 3% by mass of the fluorine-containing UV-curable resin.

6. The optical disc according to claim 4, wherein the UV-curable composition includes 30 to 70% by mass of a trifunctional (meth)acrylate monomer.

* * * * *